United States Patent
Moriuchi et al.

(10) Patent No.: US 9,110,164 B2
(45) Date of Patent: Aug. 18, 2015

(54) RADAR APPARATUS AND SIGNAL PROCESSING METHOD

(71) Applicant: FUJITSU TEN LIMITED, Kobe-shi, Hyogo (JP)

(72) Inventors: Takumi Moriuchi, Kobe (JP); Masayuki Kishida, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 284 days.

(21) Appl. No.: 13/903,225

(22) Filed: May 28, 2013

(65) Prior Publication Data

US 2013/0321195 A1 Dec. 5, 2013

(30) Foreign Application Priority Data

May 31, 2012 (JP) .................. 2012-125050

(51) Int. Cl.
*G01S 13/93* (2006.01)
*G01S 13/52* (2006.01)
*G01S 7/35* (2006.01)
(Continued)

(52) U.S. Cl.
CPC .............. *G01S 13/52* (2013.01); *G01S 7/354* (2013.01); *G01S 13/345* (2013.01); *G01S 13/931* (2013.01); *G01S 13/536* (2013.01); *G01S 2013/935* (2013.01); *G01S 2013/9321* (2013.01); *G01S 2013/9325* (2013.01); *G01S 2013/9346* (2013.01); *G01S 2013/9353* (2013.01);
(Continued)

(58) Field of Classification Search
CPC ............. G01S 7/02; G01S 7/35; G01S 7/352; G01S 7/354; G01S 13/02; G01S 13/06; G01S 13/08; G01S 13/32; G01S 13/34; G01S 13/345; G01S 13/50; G01S 13/52; G01S 13/536; G01S 13/88; G01S 13/93; G01S 13/931; G01S 2013/9321; G01S 2013/9325; G01S 2013/9346; G01S 2013/935; G01S 2013/9353; G01S 2013/9371; G01S 2013/9378; G01S 2013/9385
USPC .................. 342/27, 28, 70–72, 175, 192–197
See application file for complete search history.

(56) References Cited

U.S. PATENT DOCUMENTS 4,073,359 A * 2/1978 Fujiki et al. ...................... 342/71
4,097,864 A * 6/1978 Endo et al. ....................... 342/71
(Continued)

FOREIGN PATENT DOCUMENTS

| JP | A-2006-242695 | 9/2006 |
|---|---|---|
| JP | A-2009-133761 | 6/2009 |
| WO | WO 2007/094064 A1 | 8/2007 |

*Primary Examiner* — Bernarr Gregory
(74) *Attorney, Agent, or Firm* — Oliff PLC

(57) ABSTRACT

There is provided a radar apparatus. A first determining section is configured to determine whether there exists a continuing stationary target at a side of a lane in which a vehicle is traveling. A second determining section is configured to determine whether there exists a moving target in a specific range which is in front of the vehicle and on an opposite side of the stationary target with respect to a position of the vehicle. A changing section is configured to change position information of the moving target to a position obtained by folding back a specific position which is the position of the moving target in the specific range with the stationary target therebetween in a case where the stationary target exists and the moving target exists in the specific range. The changed position is used for deriving the position information of the target.

4 Claims, 17 Drawing Sheets

(51) Int. Cl.
  *G01S 13/34* (2006.01)
  *G01S 13/00* (2006.01)
  *G01S 13/536* (2006.01)

(52) U.S. Cl.
  CPC . *G01S2013/9375* (2013.01); *G01S 2013/9378* (2013.01); *G01S 2013/9385* (2013.01)

(56) References Cited

U.S. PATENT DOCUMENTS

| | | | |
|---|---|---|---|
| 5,598,164 A * | 1/1997 | Reppas et al. | 342/70 |
| 5,832,407 A * | 11/1998 | Kai et al. | 342/71 |
| 5,986,601 A * | 11/1999 | Sugimoto | 342/70 |
| 6,140,954 A * | 10/2000 | Sugawara et al. | 342/70 |
| 6,198,426 B1 * | 3/2001 | Tamatsu et al. | 342/70 |
| 6,311,123 B1 * | 10/2001 | Nakamura et al. | 342/71 |
| 6,469,656 B1 * | 10/2002 | Wagner et al. | 342/70 |
| 6,583,403 B1 * | 6/2003 | Koike et al. | 342/70 |
| 6,624,782 B2 * | 9/2003 | Jocoy et al. | 342/70 |
| 6,680,689 B1 * | 1/2004 | Zoratti | 342/70 |
| 6,903,677 B2 * | 6/2005 | Takashima et al. | 342/70 |
| 7,554,484 B2 * | 6/2009 | Zimmermann et al. | 342/70 |
| 7,663,533 B2 * | 2/2010 | Toennesen et al. | 342/70 |
| 8,390,509 B2 * | 3/2013 | Asanuma et al. | 342/70 |
| 8,427,361 B2 * | 4/2013 | Sato | 342/70 |
| 8,606,539 B2 * | 12/2013 | Takabayashi et al. | 342/70 |

* cited by examiner

RADAR APPARATUS AND SIGNAL PROCESSING METHOD

The disclosure of Japanese Patent Application No. 2012-125050 filed on May 31, 2012, including specification, drawings and claims is incorporated herein by reference in its entirety.

TECHNICAL FIELD

The present invention relates to signal processing in deriving the position of a target.

BACKGROUND

According to the related art, a radar apparatus of a vehicle outputs a transmission wave from the antenna of the radar apparatus. If the output transmission wave is reflected from a target and the reflected wave is received by the antenna, the radar apparatus derives the position of the target relative to the vehicle (the radar apparatus). The detailed process is as follows. In the radar apparatus, a signal processing unit mixes a transmission signal which corresponds to the transmission wave and whose frequency varies with a predetermined period, and a reception signal which corresponds to the reflected wave, thereby generating a beat signal. Specifically, the predetermined period of the transmission signal includes an UP section where the frequency increases and a DOWN section where the frequency decreases, and the signal processing unit generates a signal (hereinafter, referred to as a "beat signal") based on the frequency difference between the reception signal and the transmission signal (which is a beat frequency) in each of the UP section and the DOWN section.

Next, the signal processing unit takes the Fast Fourier Transform (FFT) of each beat signal, thereby generating signals of different frequencies (hereinafter, referred to as "transformed signals"), and detects signals exceeding a predetermined signal level threshold as peak signals from the transformed signals. Then, on the basis of information such as the signal levels and frequencies of the peak signals, the signal processing unit pairs a peak signal of the UP section corresponding to one target, and a peak signal of the DOWN section corresponding to the same target, thereby deriving pair data.

Next, on the basis of the pair data, the signal processing unit derives a distance until the reflected wave reflected from the target arrives a receiving antenna 14 of a radar apparatus 1 (hereinafter, referred to as a "longitudinal distance"). Also, the signal processing unit derives the distance between the vehicle and the target in a lateral direction relative to the traveling direction of the vehicle (hereinafter, referred to as a "lateral distance"). In other words, on the basis of the pair data, the signal processing unit derives information on the position of the target as seen from the vehicle. Further, the signal processing unit derives a relative speed which is the speed of the target relative to the running vehicle. As target categories based on relative speeds, for example, there are stationary targets having almost the same relative speed as the speed of the vehicle and moving targets having relative speeds different from the speed of the vehicle. Next, the radar apparatus outputs the derived information such as the position of a moving target to a vehicle control unit for controlling the operation of the vehicle. As a result, the vehicle control unit performs necessary control on the vehicle according to the position of the moving target and the like output from the radar apparatus. Also, as a reference for explaining a technology related to the present invention, there is Patent Document 1.

Patent Document 1: Japanese Patent Application Publication No. 2009-133761

However, for example, in a case where the vehicle is traveling at a place where stationary targets are derived in relatively large numbers, like in a tunnel, the signal processing unit of the radar apparatus cannot derive information such as the origin positions of the targets. In other words, in a frequency band where there are a number of peak signals corresponding to a continuing stationary target like in a tunnel, pairing of peak signals (hereinafter, referred to as "movement peak signals") corresponding to a moving target may not be appropriately performed. Specifically, without paring the movement peak signal of the UP section and the movement peak signal of the DOWN section, the movement peak signal of the UP section and a stationary peak signal of the DOWN section may be paired, or a stationary peak signal of the UP section and the movement peak signal of the DOWN section may be paired. As a result, pair data based on the movement peak signals may not be derived and thus information such as the position of the moving target may not be derived.

Also, in a case where the signal level of a stationary peak signal existing in the vicinity of the frequency of a movement peak signal is higher than the signal level of the movement peak signal, the movement peak signal may be included in the stationary peak signal, and thus pairing of the movement peak signal of the UP section and the movement peak signal of the DOWN section may not be performed. As a result, pair data based on the movement peak signals may not be derived and thus information such as the position of the moving target may not be derived. As a result, sometimes the vehicle control unit cannot perform necessary control on the vehicle on the basis of information such as the position of the moving target output from the radar apparatus.

SUMMARY

It is therefore an object of the present invention to derive information on the accurate position of a moving target.

In order to achieve the above object, according to a first aspect of the embodiments of the present invention, there is provided a radar apparatus configured to radiate a transmission wave relating to a frequency-modulated transmission signal, receive a reflected wave of the transmission wave from a target as a reception signal, and derive at least position information of the target from the reception signal, the radar apparatus comprising: a first determining section configured to determine whether there exists a continuing stationary target at a side of a lane in which a vehicle with the radar apparatus mounted thereon is traveling; a second determining section configured to determine whether there exists a moving target in a specific range which is in front of the vehicle and on an opposite side of the stationary target with respect to a position of the vehicle; and a changing section configured to change position information of the moving target to a position obtained by folding back a specific position which is the position of the moving target in the specific range with the stationary target therebetween in a case where the stationary target exists and the moving target exists in the specific range, wherein the position changed by the changing section is used for deriving the position information of the target.

The changing section may change the position information of the moving target to a position substantially symmetrical to the specific position about a line segment extending in a traveling direction of the vehicle and including the position of the stationary target.

The second determining section may determine whether there exists at least one stationary target between the position of the vehicle and the specific position and in a predetermined range relative to the specific position, and the changing section may change the position information of the moving target in a case where there exists the at least one stationary target.

In order to achieve the above object, according to a second aspect of the embodiments of the present invention, there is provided a signal processing method for a radar apparatus configured to radiate a transmission wave relating to a frequency-modulated transmission signal, receive a reflected wave of the transmission wave from a target as a reception signal, and derive at least position information of the target from the reception signal, the signal processing method comprising: determining whether there exists a continuing stationary target at a side of a lane in which a vehicle with the radar apparatus mounted thereon is traveling; determining whether there exists a moving target in a specific range which is in front of the vehicle and on an opposite side of the stationary target with respect to a position of the vehicle; and changing position information of the moving target to a position obtained by folding back a specific position which is the position of the moving target in the specific range with the stationary target therebetween in a case where the stationary target exists and the moving target exists in the specific range, wherein the position changed in the changing is used for deriving the position information of the target.

According to the aspects of the present invention, the position information of the moving target is set to a position which is in front of the vehicle and is on the opposite side of the stationary targets with respect to the specific position. Therefore, it is possible to derive the accurate position information of the moving target.

Also, according to the aspects of the present invention, the position information of the moving target is changed to a position which is substantially symmetrical to the specific position with respect to the line segment extending in the traveling direction of the vehicle and including the positions of the stationary targets. Therefore, it is possible to derive the accurate position information of the moving target existing at the position symmetrical to the original position.

Further, according to the aspects of the present invention, in the case where at least one stationary target exists, the position information of the moving target is changed. Therefore, it is possible to derive the accurate position information of the moving target corresponding to a multi-path reflected wave.

DETAILED DESCRIPTION OF THE EMBODIMENTS

Hereinafter, an embodiment of the present invention will be described with reference to the accompanying drawings. The following embodiment is merely illustrative and the technical scope of the present invention is not limited thereto.

First Embodiment

<1. Configuration>
<1-1. General View of Vehicle>

Figure 1:
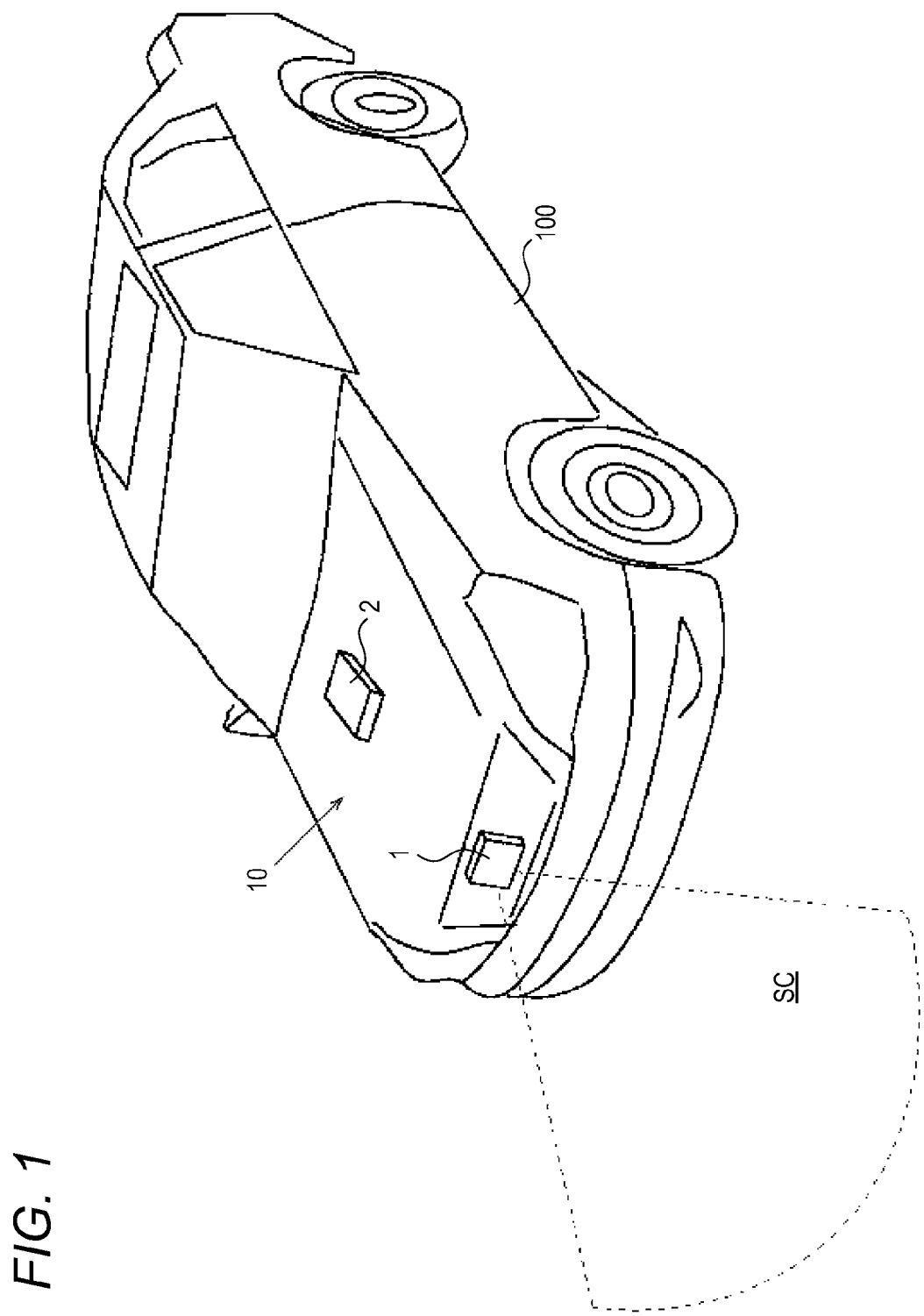
FIG. 1 is a general view of a vehicle.

FIG. 1 is a general view of a vehicle 100. The vehicle 100 has a radar apparatus 1 which is included in a vehicle control system 10 of the present embodiment, and a vehicle control device 2. The radar apparatus 1 is installed at a front portion of the vehicle. The radar apparatus 1 performs scanning once to scan a scan range SC, and derives the position information of a target including the longitudinal distance and lateral distance of the target relative to the vehicle 100. The lateral distance of the target relative to the vehicle 100 corresponds to the angle of the target relative to the vehicle 100. Also, the radar apparatus 1 derives the relative speed of the target to the speed of the vehicle 100.

Although the radar apparatus 1 of FIG. 1 has been mounted on a front portion of the vehicle, the mounting position of the radar apparatus 1 on the vehicle 100 is not limited to the front portion. The radar apparatus 1 may be mounted on any other portion such as a rear portion of the vehicle 100 or a side mirror of the vehicle 100 where it is possible to derive the positions of targets.

The vehicle control device 2 is installed inside the vehicle 100, and is an electronic control unit (ECU) for controlling each unit of the vehicle 100.

<1-2. Block Diagram of System>

Figure 2:
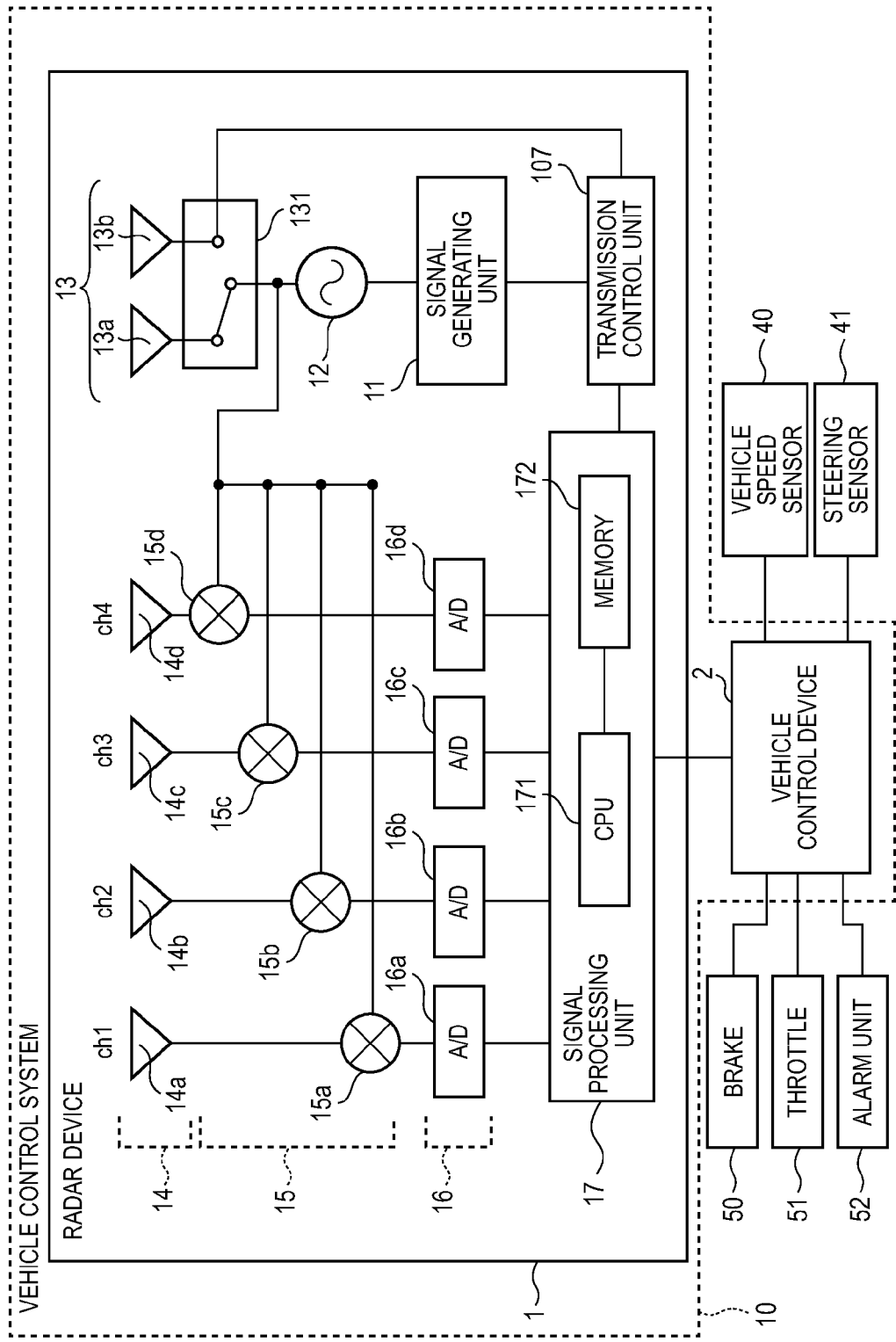
FIG. 2 is a block diagram illustrating a vehicle control system.

FIG. 2 is a block diagram of the vehicle control system 10. The vehicle control system 10 includes the radar apparatus 1 and the vehicle control device 2. In the vehicle control system 10, the radar apparatus 1 and the vehicle control device 2 are electrically connected, and the vehicle control system 10 mainly outputs data of targets (hereinafter, referred to as the "target data") derived by the radar apparatus 1, to the vehicle control device 2. In other words, the radar apparatus 1 outputs target data which are information on the longitudinal distances, lateral distances, and relative speeds of targets relative to the vehicle 100, to the vehicle control device 2. Then, on the basis of the target data, the vehicle control device 2 controls the operation of each unit of the vehicle 100. Also, the vehicle control device 2 is electrically connected to various sensors such as a vehicle speed sensor 40 and a steering sensor 41 provided to the vehicle 100. Further, the vehicle control device 2 is electrically connected to various units such as a brake 50, a throttle 51, and an alarm unit 52 provided to the vehicle 100. Furthermore, the vehicle speed sensor 40, the steering sensor 41, the brake 50, the throttle 51, and the alarm unit 52 are installed outside the vehicle control system 10.

The radar apparatus 1 derives the target data of an object such as another vehicle which exists at the periphery of the vehicle 100 with the radar apparatus 1. Specifically, the radar apparatus 1 radiates a transmission wave relating to a frequency-modulated transmission signal. If the transmission wave is reflected from a target, the radar apparatus 1 receives the reflected wave as a reception signal, and derives the target data from the reception signal. Then, on the basis of the target data derived by the radar apparatus 1, the vehicle control device 2 outputs various signals such as control signals for operating the brake 50, adjusting the opening of the throttle 51, and reporting an alarm of the alarm unit 52 to the user of the vehicle.

The radar apparatus 1 mainly includes a signal generating unit 11, an oscillator 12, transmitting antennae 13, receiving antennae 14, mixers 15, analog-to-digital (AD) converters 16, and a signal processing unit 17.

The signal generating unit 11 generates a modulated signal with a voltage changing, for example, in a triangular wave form, on the basis of a control signal of a transmission control unit 107 to be described below.

The oscillator 12 is a voltage control oscillator for controlling an oscillation frequency by a voltage, and performs frequency modulation on a signal in a predetermined frequency band (for example, a signal in a frequency band having 76.5 GHz as the center frequency) on the basis of the modulated signal generated by the signal generating unit 11, and outputs the frequency-modulated signal as the transmission signal to the transmitting antennae 13.

The transmitting antennae 13 output a transmission wave relating to the transmission signal to the outside of the vehicle. The radar apparatus 1 of the present embodiment includes two transmitting antennae, that is, a transmitting antenna 13a and a transmitting antenna 13b. Switching between the transmitting antennae 13a and 13b is performed with a predetermined period by switching of a switching unit 131, and the transmission wave is continuously output from a transmitting antenna 13 connected to the oscillator 12 to the outside of the vehicle.

The switching unit 131 is a switch for switching between the transmitting antennae 13 to be connected to the oscillator 12, and connects any one transmitting antenna of the transmitting antenna 13a and the transmitting antenna 13b to the oscillator 12 according to a signal of the transmission control unit 107.

The receiving antennae 14 is a plurality of antennae for receiving a reflected wave of a transmission wave, continuously transmitted from a transmitting antenna 13, from a target. In the present embodiment, there are provided four receiving antennae, that is, a receiving antennae 14a (ch1), 14b (ch2), 14c (ch3), and 14d (ch4). The receiving antennae 14a to 14d are disposed at regular intervals.

The mixers 15 are provided for the receiving antennae, respectively. Each mixer 15 mixes a reception signal and a transmission signal, thereby generating a beat signal which is a difference signal between the transmission signal and the reception signal and the transmission signal, and outputs the beat signal to a corresponding AD converter 16.

The AD converter 16 samples the beat signal which is an analog signal, at predetermined intervals, thereby deriving a plurality of sample data items. Then, the AD converter 16 quantizes the sample data items, thereby converting the beat signal which is analog data, into digital data, and outputs the digital data to the signal processing unit 17. Like the mixers 15, the AD converters 16 are also provided for the receiving antennae, respectively.

The signal processing unit 17 is a computer including a CPU 171 and a memory 172, and derives target data on the basis of the beat signal output from the AD converter 16. Here, the signal processing unit 17 derives a peak signal in the process of deriving the target data from the beat signal. This peak signal has a frequency depending on the channel of the reflected wave of the transmission wave from the object to the antenna. For example, in a case where a transmission wave radiated from the antennae is reflected from different targets (different reflective points) of one object (for example, a front vehicle traveling in front of the vehicle 100), if a reflected wave from a target corresponding to a reflective point of the front vehicle is directly received by the antennae, without being reflected from any other reflective point, the peak signal of the reflected wave (hereinafter, referred to as the "direct wave") has one frequency. Also, if a reflected wave from a target is further reflected from another reflective point, and is received by the antennae, the peak signal of the reflected wave (hereinafter, referred to as the "multi-path reflected wave") has a frequency different from the frequency of the peak signal of the direct wave. Further, a peak signal corresponding to a direct wave has a frequency corresponding to the original point information of a corresponding target; whereas a peak signal corresponding to a multi-path reflected wave has a frequency corresponding to position information different from the original position of a corresponding target due to reflection of a corresponding reflected wave from another target. Also, whether a reflected wave will be a direct wave or a multi-path reflected wave depends on the shape of a corresponding reflective point or the surroundings of the vehicle (such as whether there exists any obstacle).

Further, the signal processing unit 17 determines whether there exists any continuing stationary target such as the inside wall of a tunnel or a guardrail around the vehicle 100, on the basis of the derived target data. In other words, the signal processing unit 17 determines whether there exists any continuing stationary target (for example, a stationary target continuing for a distance of 40 m or more) at a side of a lane in which the vehicle 100 is traveling. This is a process for determining whether the surroundings of the traveling vehicle 100 are circumstances in which a multi-path reflected wave may occur. In order to determine whether there exists any continuing stationary target, the signal processing unit 17 may determine whether the actual length of a continuing stationary target is a predetermined value or more, or may determine whether the number or density of stationary targets in a predetermined distance range is a predetermined value or more.

Then, the signal processing unit 17 determines whether there exists any moving target such as a vehicle in a specific range on the opposite side of the inside wall of a tunnel, a guardrail, or the like with respect to the position of the vehicle 100. In other words, the signal processing unit 17 determines whether there exists any moving target in the specific range on the opposite side of a continuing stationary target with respect to the position of the vehicle 100 in front of the vehicle 100. This is a process for determining whether there exists any moving target based on a multi-path reflected wave in front of the vehicle 100. Here, the specific range on the opposite side of a stationary target with respect to the position of the vehicle 100 means the predetermined range on the opposite side of a continuing stationary target with respect to the position of the vehicle 100.

In a case where the surroundings of the vehicle 100 are circumstances in which a multi-path reflected wave may occur like in a tunnel, and there exists a moving target in the specific range, the signal processing unit 17 changes the position information of the moving target from the position of the moving target existing in the specific range to another position with the inside wall of a tunnel, a guardrail, or the like therebetween. In other words, in the case where there exists a continuing stationary target and there exists a moving target in the specific range, the signal processing unit 17 changes the position information of the moving target to a position obtained by folding back a specific position which is the position of the moving target in the specific range with the continuing stationary target therebetween. This is a process for changing the position information of the moving target based on the multi-path reflected wave to the original position of the moving target. In this way, it is possible to derive the accurate position information of the moving target. Here, the position obtained by folding back the specific position with the continuing stationary target therebetween means a position on the opposite side of the specific position with respect to the stationary target.

The CPU 171 performs various arithmetic processes on the basis of various programs recorded in the memory 172. For example, the signal processing unit 17 performs a process of changing the position information of the moving target from the specific position to another position with the continuing stationary target therebetween.

The memory 172 stores programs for performing various arithmetic processes to be executed by the CPU 171, and so on. Also, the memory 172 stores information of a plurality of target data items derived by the signal processing unit 17. For example, the memory 172 stores target data (the longitudinal distances, lateral distances, and relative speeds of targets) derived in the past scanning and the current scanning. Further, the memory 172 stores the state of a flag (a reflection target flag to be described below) representing whether a moving target is a target based on a multi-path reflected wave as will be described below.

The transmission control unit 107 is connected to the signal processing unit 17, and outputs a control signal to the signal generating unit 11 for generating a modulated signal, on the basis of a signal from the signal processing unit 17. Also, on the basis of a signal from the signal processing unit 17, the transmission control unit 107 outputs a control signal to the switching unit 131 for connecting the oscillator 12 to any one transmitting antenna of the transmitting antenna 13a and the transmitting antenna 13b.

The vehicle control device 2 controls the operation of each unit of the vehicle 100. In other words, the vehicle control device 2 acquires information from various sensors such as the vehicle speed sensor 40 and the steering sensor 41. Then, on the basis of the information acquired from the various sensors and target data acquired from the signal processing unit 17 of the radar apparatus 1, the vehicle control device 2 operates various units such as the brake 50, the throttle 51, and the alarm unit 52 to control the motion of the vehicle 100.

An example of the control of the vehicle control device 2 on the vehicle is as follows. The vehicle control device 2 performs control such that the vehicle 100 follows a front vehicle (for example, a front vehicle 200 shown in FIG. 4) traveling in front of the vehicle 100 in the lane in which the vehicle 100 is traveling (for example, a lane ro1 shown in FIG. 4 to be described below). Specifically, the vehicle control device 2 controls at least one of the brake 50 and the throttle 51 according to the traveling of the vehicle 100, thereby performing control such that the vehicle 100 follows the front vehicle 200 with a predetermined distance between the vehicle 100 and the front vehicle 200. An example of this control is adaptive cruise control (ACC).

Also, another example of the control of the vehicle control device 2 on the vehicle is as follows. In a case where there is a danger of a crash, the vehicle control device 2 controls the alarm unit 52 such that the alarm unit displays a warning, and controls the brake 50 such that the speed of the vehicle 100 is reduced. Further, the vehicle control device 2 performs control such that an occupant is fixed to the seat by a seat belt during a crash so as to brace for the impact or a headrest is fixed to reduce damage to the body of the occupant. An example of this control is a pre-crash safety system (PCS). Also, the following description will be made on the premise of the ACC for making the vehicle 100 follow the front vehicle 200.

The vehicle speed sensor 40 outputs a signal according to the speed of the vehicle 100 on the basis of the number of revolutions of the axle of the vehicle 100. On the basis of the signal from the vehicle speed sensor 40, the vehicle control device 2 acquires the current speed of the vehicle.

The steering sensor 41 senses the rotation angle of a steering wheel according to the operation of the driver of the vehicle 100, and transmits the angle information of the vehicle 100 to the vehicle control device 2.

The brake 50 reduces the speed of the vehicle 100 according to the operation of the driver of the vehicle 100. Also, the brake 50 reduces the speed of the vehicle 100 according to the control of the vehicle control device 2. For example, the brake 50 reduces the speed of the vehicle 100 to maintain the distance between the vehicle 100 and the front vehicle 200 at a predetermined distance.

The throttle 51 reduces the speed of the vehicle 100 according to the operation of the driver of the vehicle 100. Also, the throttle 51 reduces the speed of the vehicle 100 according to the control of the vehicle control device 2. For example, the throttle 51 reduces the speed of the vehicle 100 to maintain the distance between the vehicle 100 and the front vehicle 200 at a predetermined distance.

The alarm unit 52 operates in response to a signal from the vehicle control device 2. For example, in a case where there is a possibility of a crash of the vehicle 100 and the front vehicle 200, the alarm unit 52 outputs an alarm to the driver of the vehicle 100 against the crash.

<2. Signal Processing of FM-CW>

Now, as an example of a signal processing scheme in which the radar apparatus 1 derives the position of a target, a frequency modulated continuous wave (FM-CW) scheme will be described. Although the FM-CW scheme will be described as an example in the present embodiment, the present invention is not limited to the FM-CW scheme, but may be applied to any scheme of combining a plurality of sections, such as an UP section in which the frequency of a transmission signal increases, and a DOWN section in which the frequency of a transmission signal decreases, thereby deriving a target.

Also, in the following equations and FIG. 3, the reference symbols of FM-CW signals and beat frequencies are as follow. A symbol fr denotes a distance frequency, a symbol fd denotes a speed frequency, a symbol fo denotes the center frequency of a transmission wave, a symbol ΔF denotes a frequency shift width, a symbol fm denotes the repetition frequency of a modulated wave, a symbol c denotes a light speed (the speed of an electric wave), a symbol T denotes the round-trip time of the electric wave between the vehicle 100 and a target, a symbol fs denotes a transmission (reception) frequency, a symbol fb denotes a beat frequency, a symbol R denotes a longitudinal distance, a symbol V denotes a relative speed, a symbol fup denotes the distance frequency of an UP section, a symbol fdn denotes the distance frequency of a DOWN section, a symbol θm denotes the angle of the target, a symbol θup denotes an angle corresponding to the beat signal of the UP section, and a symbol θdn denotes an angle corresponding to the beat signal of the DOWN section.

Figure 3:
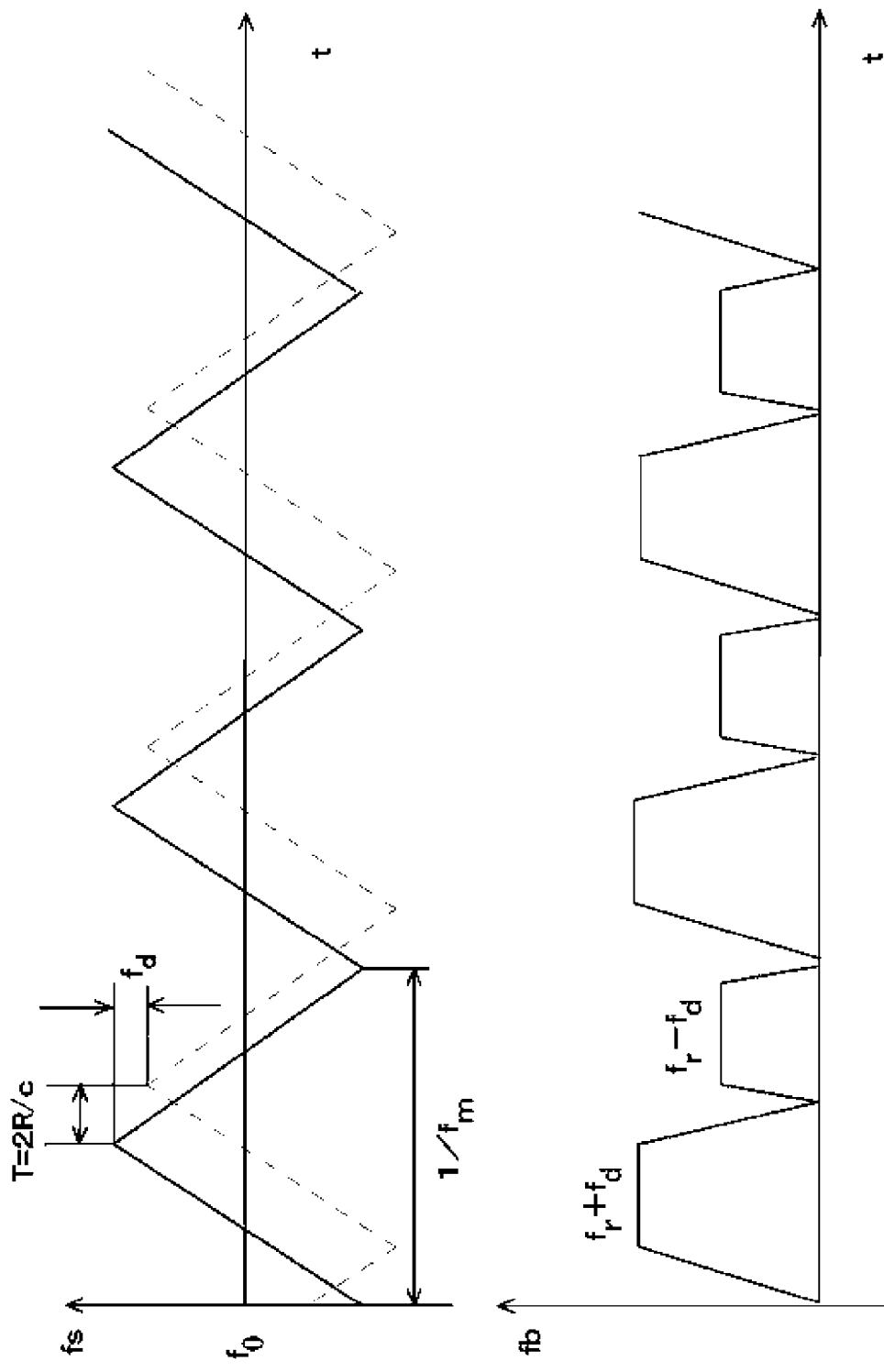
FIG. 3 is a view mainly illustrating the waveforms of a transmission signal and a reception signal of a radar apparatus.

FIG. 3 is a view mainly illustrating a transmission signal and reception signal of the radar apparatus 1. The upper view of FIG. 3 shows the signal waveforms of a FM-CW transmission signal and a FM-CW reception signal. The lower view of FIG. 3 shows beat frequencies generated by the frequency difference between the transmission signal and the reception signal. In the upper view of FIG. 3, the horizontal axis represents time (ms), and the vertical axis represents frequency (GHz). The transmission signal shown by a solid line in the upper view of FIG. 3 has the characteristic that the frequency changes with a predetermined period, and has UP sections where the frequency increases from a predetermined lower frequency to a predetermined upper frequency, and DOWN sections where the frequency decreases from the predetermined upper frequency to the predetermined lower frequency. In other words, the transmission signal periodically changes between the predetermined lower frequency and the predetermined upper frequency. If the transmission wave is output from a transmitting antenna 13 and is reflected from a target, a receiving antenna 14 receives the reflected wave as a reception signal. The reception signal is as shown by a broken line in FIG. 3. Similarly to the transmission signal, the reception signal also has UP sections and DOWN sections.

Also, according to the longitudinal distance between the vehicle 100 and the target, the reception signal has a time delay T (=2R/c) relative to the transmission signal. Further, in a case where there is a speed difference between the vehicle 100 and the target, with respect to the transmission signal, the reception signal shifts in parallel along the axis of the frequency fs. This Doppler shift amount becomes fd.

In the lower view of FIG. 3, the horizontal axis represents time (ms), and the vertical axis represents frequency (KHz). The lower view of FIG. 3 shows beat frequencies representing the frequency difference between the transmission signal and the reception signal in each UP section, and the frequency difference between the transmission signal and the reception signal in each DOWN section.

Here, the longitudinal distance of the target relative to the vehicle 100 is derived by Equation 1, and the relative speed of the target relative to the vehicle 100 is derived by Equation 2. Also, the angle of the target relative to the vehicle 100 is derived by Equation 3. Then, from information on the angle derived by Equation 3 and the longitudinal distance of the target, the lateral distance of the target relative to the vehicle 100 is derived by an operation using a trigonometric function.

$$R = \frac{(fup + fdn) \cdot c}{2 \times (4 \times \Delta F \times fm)} \quad \text{[EQUATION 1]}$$

$$V = \frac{(fup - fdn) \cdot c}{2 \times (4 \times \Delta F \times fm)} \quad \text{[EQUATION 2]}$$

$$\theta m = \frac{\theta up + \theta dn}{2} \quad \text{[EQUATION 3]}$$

<3. Derivation of Position Information of Target Based on Reflected Wave>
<3-1. Scan Range>

Figure 4:
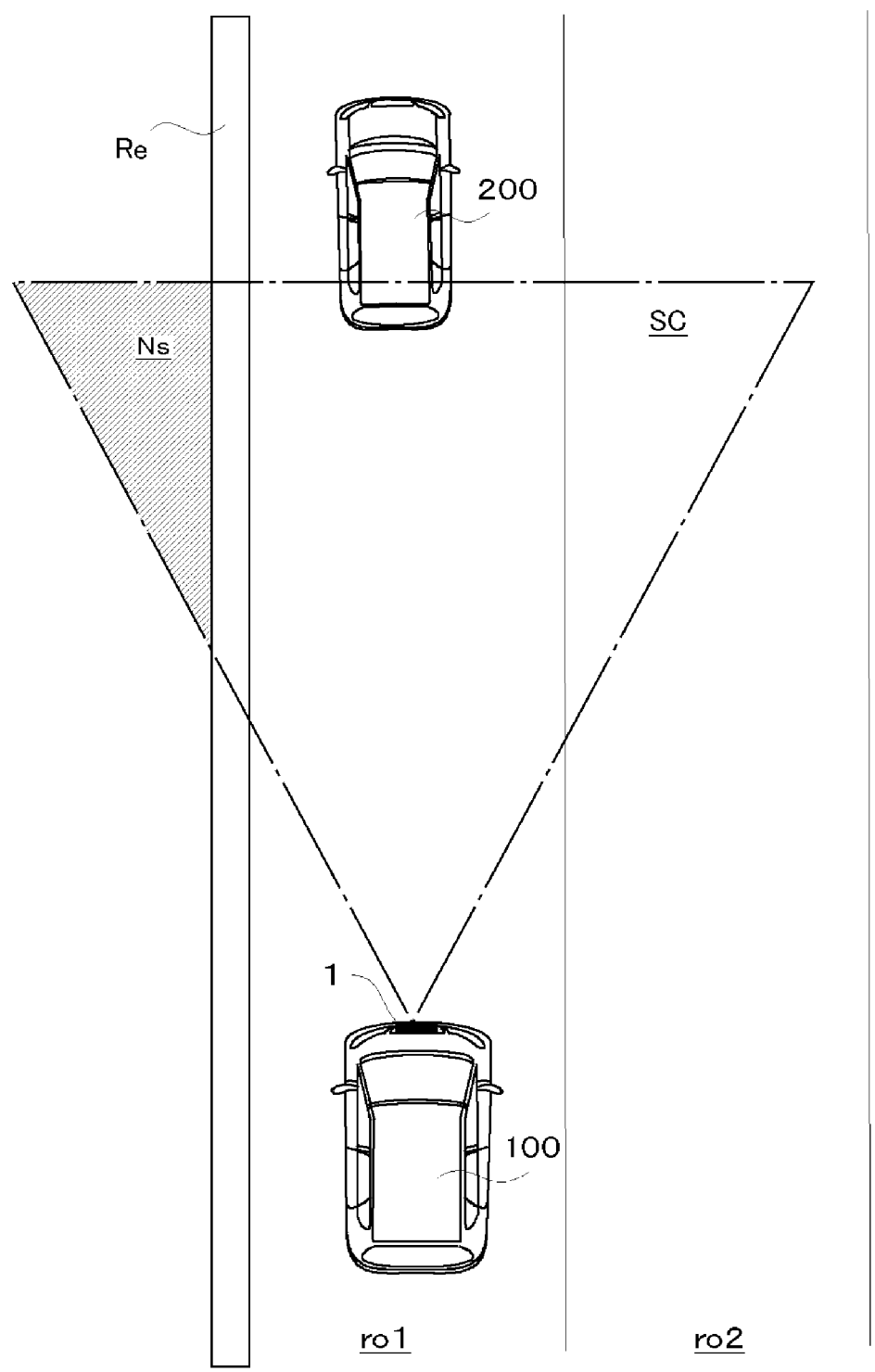
FIG. 4 is a view mainly illustrating the scan range of a radar apparatus mounted on a vehicle.

Now, a moving target deriving process of the signal processing unit 17 will be described with reference to FIGS. 4 to 9. FIG. 4 is a view mainly illustrating the scan range SC of the radar apparatus 1 mounted on the vehicle 100. Also, FIG. 4 shows the vehicle 100 traveling in the lane ro1, the front vehicle 200 traveling in front of the vehicle 100 in the same lane ro1 as that of the vehicle 100, and a shelter Re located on the left side of the lane ro1 in which the vehicle 100 is traveling. Here, the front vehicle 200 is a moving target to be derived by the signal processing unit 17 of the radar apparatus 1, and becomes, for example, an object to be followed in the ACC of the vehicle control device 2. Also, the shelter Re is, for example, the inside wall of a tunnel or a guardrail, and is a continuing stationary target to be derived by the signal processing unit 17.

The transmission wave is radiated from the radar apparatus 1 over the scan range SC including a portion of the lane ro1 including the front vehicle 200, a portion of the shelter Re, and a portion of a neighboring lane ro2 next to the lane ro1. Then, the radar apparatus 1 receives reflected waves from the front vehicle 200 and the shelter Re by the receiving antennae 14. Here, since there is the shelter Re, the scan range SC includes a sheltered area Ns is an area where the transmission wave does not reach. Therefore, the signal processing unit 17 does not originally derive the data of a target in the sheltered area Ns. Like this, the radar apparatus 1 performs scanning once, thereby receiving reflected waves from a moving target like the front vehicle 200 and a stationary target like the shelter Re by the receiving antennae 14, and derives target data including the position information and relative speed of each target.

<3-2. Angle and Longitudinal Distance of Target>

Figure 5:
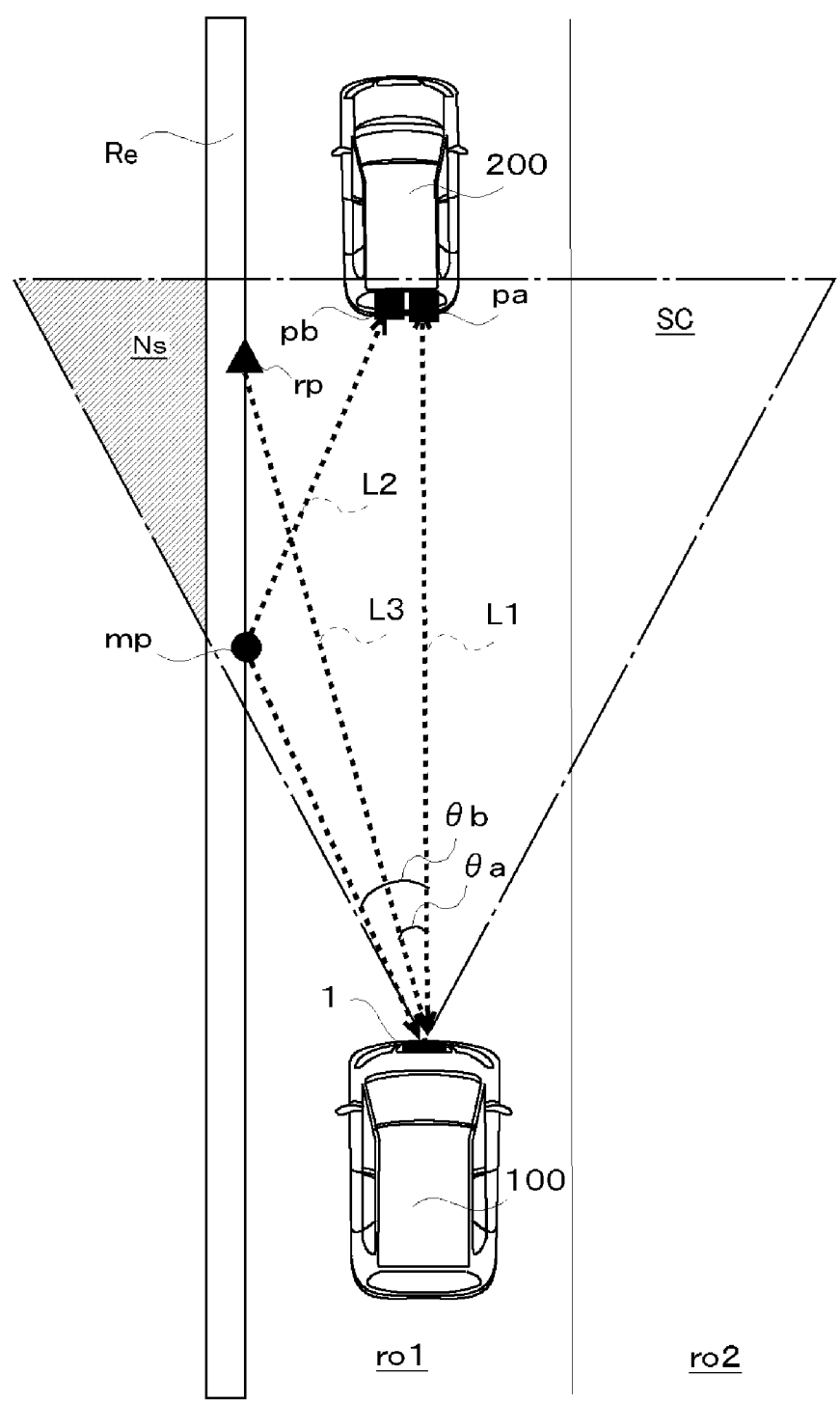
FIG. 5 is a view mainly illustrating the angles and longitudinal distances of targets relative to the vehicle.

FIG. 5 is a view mainly illustrating the angle and longitudinal distance of each target relative to the vehicle 100. Also, FIG. 5 shows a moving target pa and a moving target pb corresponding to a plurality of reflective points of the rear bumper of the front vehicle 200, and a stationary target rp corresponding to one reflective point of the shelter Re. First, the angle of each target will be described. For example, in a case where the angle of a target, being directly in front of the vehicle 100, relative to the vehicle 100 is set to 0 degree, the angle of the moving target pa existing directly in front of the vehicle 100 becomes 0 degree, the angle of the stationary target rp becomes an angle θa, and the angle of the moving target pb becomes an angle θb larger than the angle θa. The signal processing unit 17 derives the angle of each target on the basis of the reflected wave of the corresponding target. Here, with respect to the moving target pb, an angle different from the original angle is derived for the following reason. In other words, the transmission wave radiated from the transmitting antennae 13 is reflected from the moving target pb and the reflected wave is reflected from a reflective point mp of the shelter Re, whereby the multi-path reflected wave is received by the receiving antennae 14 and the moving target pb is derived from the multi-path reflected wave. For this reason, the signal processing unit 17 derives the angle θb corresponding to the position of the reflective point mp as the angle of the moving target pb.

Also, the lateral distance of each moving target or stationary target is derived by an operation of a trigonometric function using the angle and longitudinal distance of the corresponding target. For example, the lateral distance of the stationary target rp is derived by an operation of a trigonometric function using the angle θa and a longitudinal distance L3 to be described below.

Now, the longitudinal distance of each target will be described. The signal processing unit 17 derives the longitudinal distance of each of the moving target pa, the moving target pb, and the stationary target rp relative to the vehicle 100 on the basis of the reflected wave of the corresponding target. As shown in FIG. 5, the longitudinal distances of the moving target pa, the moving target pb, and the stationary target rp relative to the vehicle 100 are L1, L2, and L3, respectively. Here, with respect to the moving target pb, a distance different from the original longitudinal distance is derived for the following reason. In other words, the transmission wave radiated from the transmitting antennae 13 of the radar apparatus 1 is reflected from the moving target pb and the reflected wave is reflected from the reflective point mp of the shelter Re, whereby the multi-path reflected wave is received by the receiving antennae 14 and the moving target pb is derived from the multi-path reflected wave. For this reason, the signal processing unit 17 derives the longitudinal distance L2, which is the sum of a distance from the moving target pb to the reflective point mp and a distance from the reflective point mp to the vehicle 100, as the longitudinal distance of the moving target pb. However, the position (angle and longitudinal distance) of the moving target pb derived by the signal processing unit 17 becomes a position corresponding to a moving target pc (to be described below with reference to FIG. 6), not the original position of the moving target pb.

<3-3. Position of Target of Multi-Path Reflected Wave>

Figure 6:
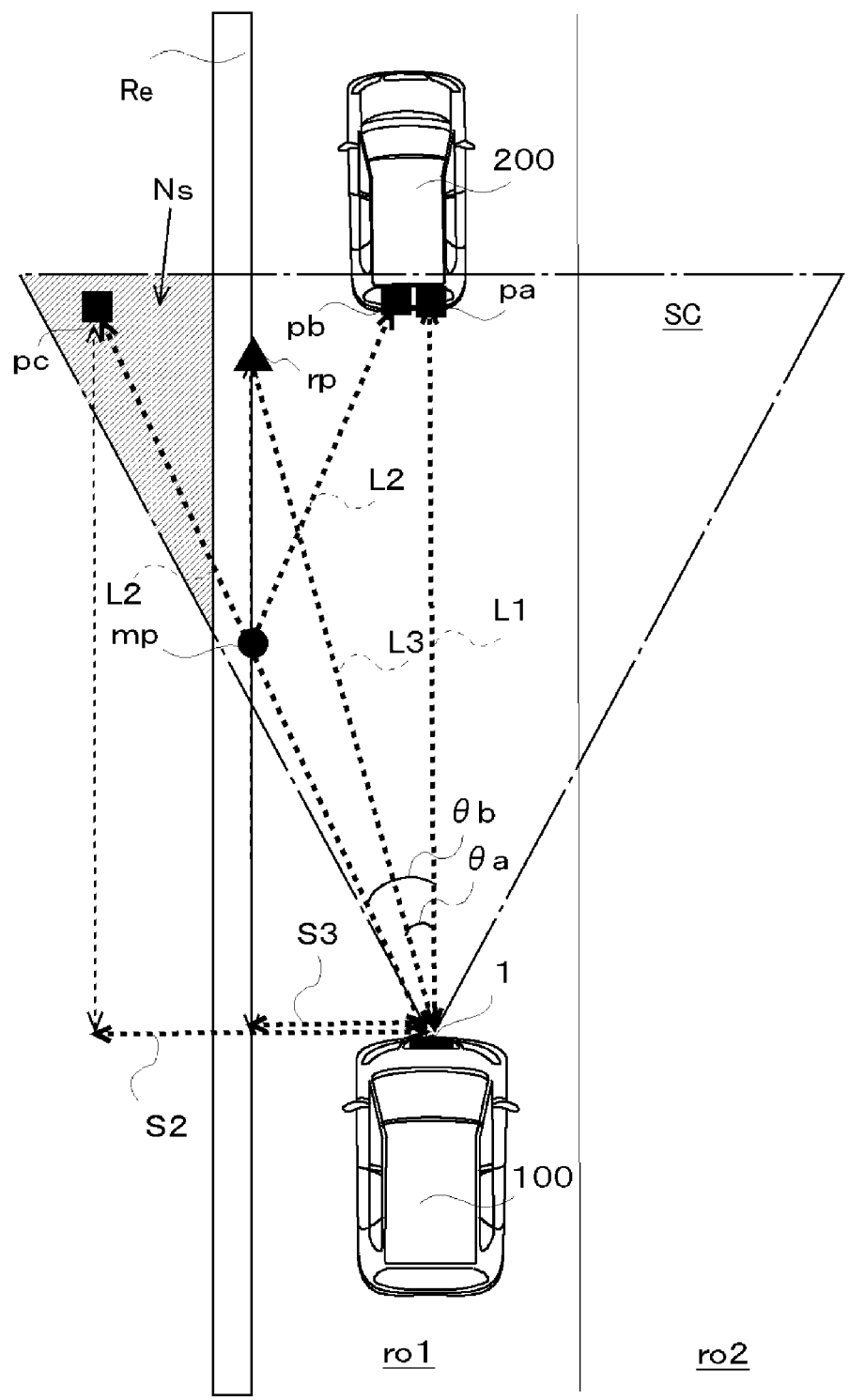
FIG. 6 is a view mainly illustrating the position of a moving target based on a multi-path reflected wave.

FIG. 6 is a view mainly illustrating the position of the moving target pc based on the multi-path reflected wave. Also, FIG. 6 shows the moving target pc which the signal processing unit 17 of the radar apparatus 1 derives on the basis of the multi-path reflected wave from the moving target pb of FIG. 5 described above. The position of the moving target pc is as follows. In other word, the angle of the moving target pc is the same angle θb as that of the reflective point mp, and the longitudinal distance of the moving target pc is the longitudinal distance L2. Further, as the lateral distance of the moving target pc, a lateral distance S2 is derived by an operation of a trigonometric function using the angle θb and the longitudinal distance L2. Further, the lateral distance of the stationary target rp becomes a lateral distance S3 by an operation of a trigonometric function using the angle θa and the longitudinal distance L3. Furthermore, the position of the moving target pc is in the range of the sheltered area Ns separated by the shelter Re, where the target is not originally derived.

With reference to FIG. 6, one stationary target rp corresponding to one reflective point of the shelter Re has been described as an example. However, from the shelter Re placed in the scan range SC of the radar apparatus 1, with respect to the transmission wave from the transmitting antennae 13 of the radar apparatus 1, a plurality of reflected waves is received from a plurality of reflective points of the shelter Re by the receiving antennae 14. Then, in a case where the frequencies of a plurality of stationary peak signals corresponding to the plurality of reflected waves exist in the vicinity of the frequency of a peak signal (hereinafter, referred to as a "movement direct peak signal") corresponding to the direct wave from the moving target pa, for example, if the signal levels of the stationary peak signals are higher than the signal level of the movement direct peak signal, the movement direct peak signal may be included in the stationary peak signals such that the pair data of the movement direct peak signal cannot be derived.

Also, even in a case where the pair data of a peak signal (hereinafter, referred to as a "movement indirect peak signal") corresponding to the multi-path reflected wave from the moving target pb is derived, position information different from the original point information is derived. Therefore, the signal processing unit 17 of the radar apparatus 1 cannot derive the accurate position information of the moving target corresponding to the front vehicle 200 and thus the vehicle control device 2 cannot make the vehicle 100 follow the front vehicle 200 on the basis of the accurate position information.

In a case where the vehicle 100 is traveling at a place like in a tunnel, even if it is impossible to derive pair data based on the movement direct peak signal of one target, pair data based on the corresponding target may be derived. In a case where the number of stationary peak signals in the vicinity of the frequency of the movement indirect peak signal in one process of a plurality of target deriving processes of the radar apparatus 1 is smaller than those in the other processes as the surroundings of the vehicle 100 change with time, the movement indirect peak signal may be detected and the pair data of the movement indirect peak signal may be derived.

Also, even in a case where there is a plurality of stationary peak signals in the vicinity of the frequency of the movement indirect peak signal, if the signal level of the movement indirect peak signal is higher than the signal levels of the stationary peak signals, the movement indirect peak signal may be detected and the pair data based on the movement indirect peak signal may be derived. As a result, even in a case where it is impossible to derive the moving target based on the pair data of the movement direct peak signal, the moving target based on the pair data of the movement indirect peak signal may be derived. For this reason, the position information of the moving target based on the pair data of the movement indirect peak signal is used to perform the process of deriving the original position of the moving target. Hereinafter, the outline of the target data deriving process of the signal processing unit 17 will be described, and then a process of changing the position information of the moving target based on the pair data of the movement indirect peak signal, that is, the moving target based on the multi-path reflected wave will be described in detail.

<4. Process Flow Chart>

<4-1. Entire Process>

Figure 7:
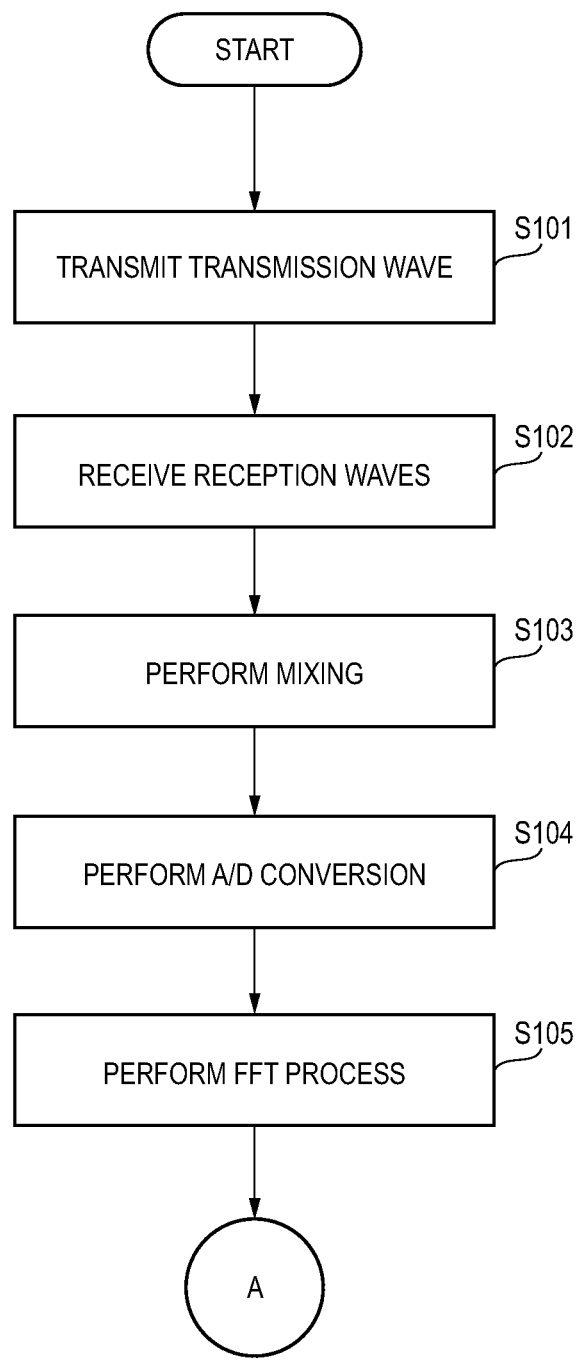
FIG. 7 is a flow chart of a target data deriving process.
Figure 8:
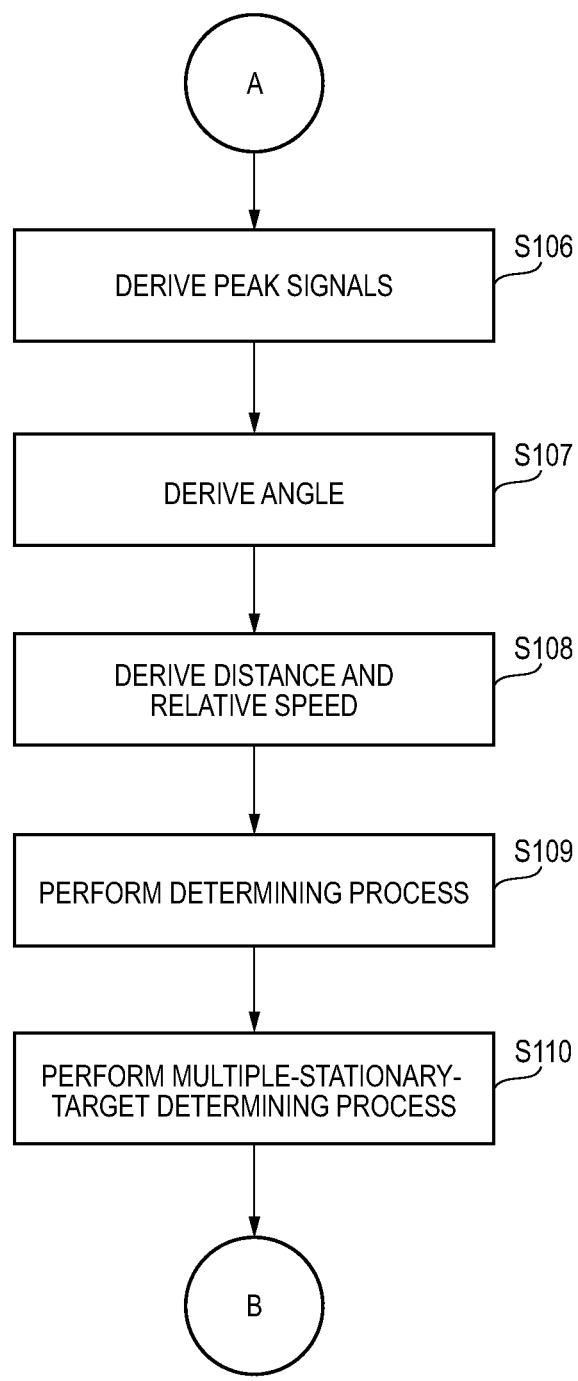
FIG. 8 is another flow chart of the target data deriving process.
Figure 9:
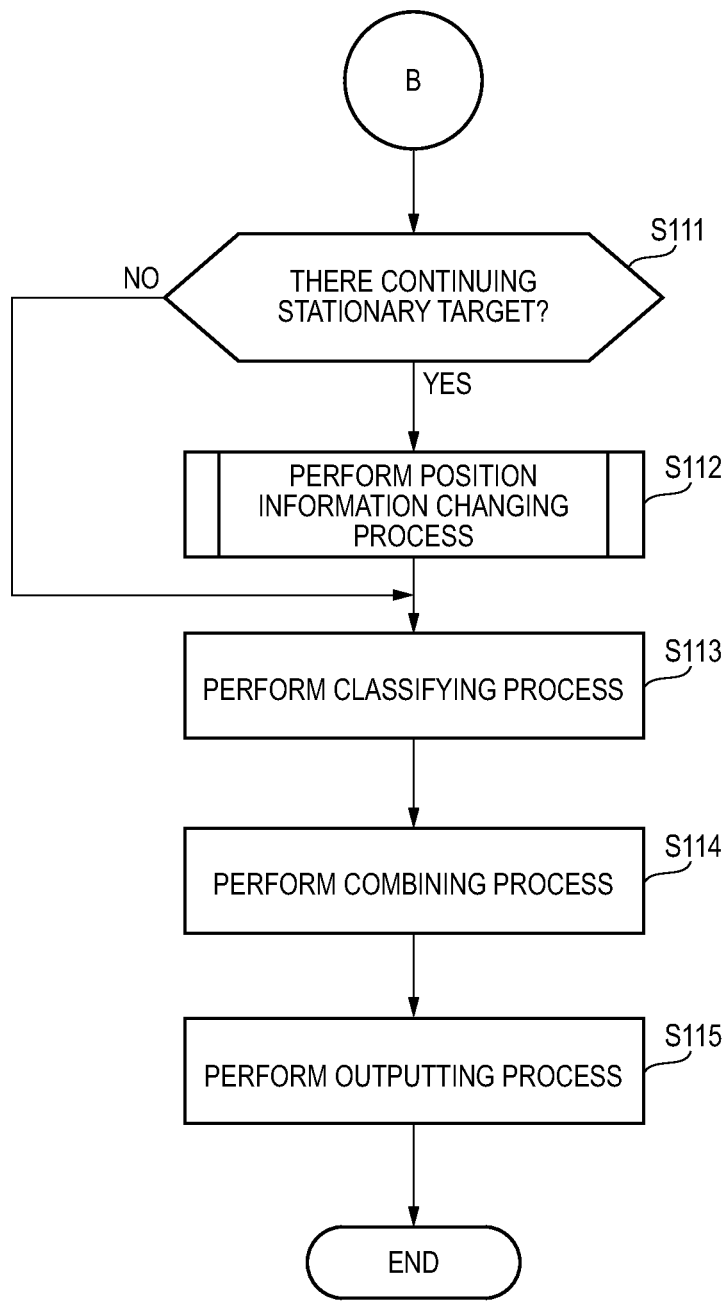
FIG. 9 is a further flow chart of the target data deriving process.

FIGS. 7 to 9 are flow charts of the target data deriving process. As shown in FIG. 7, first, in STEP S101, the transmitting antennae 13 outputs a transmission wave corresponding to a transmission signal output from the oscillator 12 to the outside of the vehicle 100.

Also, in a case where one UP section and one DOWN section of the transmission signal constitute one period, the transmitting antennae 13 outputs the transmission wave corresponding to the first period from one transmitting antenna 13a to the outside of the vehicle, and outputs the transmission wave corresponding to the second period from the other transmitting antenna 13b to the outside of the vehicle.

If the transmission wave is reflected from a target, in STEP S102, the receiving antennae 14 receive the reflected waves (the direct wave and the multi-path reflected wave).

Next, in STEP S103, the mixers 15 mix reception signals corresponding to the reflected waves received by the receiving antennae 14 with the transmission signal, thereby generating beat signals which are differences between the transmission signal and the reception signals.

Then, in STEP S104, the AD converters 16 covert the beat signals which are analog signals into digital data.

Subsequently, in STEP S105, the signal processing unit 17 performs FFT on the beat signals of the digital data, thereby generating the transformed signals.

Next, as shown in FIG. 8, in STEP S106, from the transformed signals, the signal processing unit 17 derives transformed signals exceeding a predetermined threshold value as peak signals.

In STEP S107, the signal processing unit 17 performs an angle computing process on the basis of the peak signals in each of the UP section and the DOWN section. Specifically, the signal processing unit 17 derives the angle of the target according to a predetermined angle deriving process algorithm. For example, the angle deriving process algorithm is Estimation of Signal Parameters via Rotational Invariance Techniques (ESPRIT), and the eigenvalue, eigenvector, and the like of a correlation matrix is computed from information on the phase differences between the reception signals of the receiving antennae 14a to 14d, and an angle θup corresponding to the peak signal of the UP section and an angle θdn corresponding to the peak signal of the DOWN section are derived. Further, on the basis of the angles of the peak signals of the UP section and the DOWN section, the angle of the target data is derived by the above Equation 3.

Next, in STEP S108, the signal processing unit 17 pairs the peak signals of the UP section and the DOWN section, and derives the longitudinal distance and relative speed of the target relative to the vehicle 100 on the basis of the above Equations 1 and 2.

The signal processing unit 17 performs a process of determining whether there is a temporarily continuing relation between the pair data (hereinafter, referred to as "current pair data") obtained by the current target deriving process and data (hereinafter, referred to as "predicted pair data") obtained by predicting the current pair data on the basis of the target data derived by the past target deriving process. Then, in a case where there is a temporarily continuing relation between them, a filtering process is performed between the current pair data and the predicted pair data, and the filtered pair data (hereinafter, referred to as "past corresponding pair data") as the target data of the current scanning. Here, the case where there is a temporarily continuing relation between the current pair data and the predicted pair data is, for example, a case where each of the values of the differences in the longitudinal distance, lateral distance, and relative speed between the current pair data and the predicted pair data is a predetermined value or less. Further, in the case where there is a temporarily continuing relation between the current pair data and the predicted pair data, with respect to the longitudinal distances, the signal processing unit 17 assigns a weight of 0.5 to the longitudinal distance of the predicted pair data, and assigns a weight of 0.5 to the longitudinal distance of the current pair data. Then, the signal processing unit 17 derives the sum of the weighted values as the longitudinal distance of the past corresponding pair data of the current scanning. Similarly, even with respect to the relative speeds and the angles, a filtering process is performed.

Meanwhile, in a case where any one of the values of the differences in the longitudinal distance, lateral distance, and relative speed between the current pair data and the predicted pair data is greater than the predetermined value, the signal processing unit 17 determines that there is no temporarily continuing relation between the current pair data and the predicted pair data. Then, the pair data determined as having no continuity like that becomes data (hereinafter, referred to as "new pair data" derived for the first time in the current target deriving process. The distance, relative speed, angle, and signal level of the new pair data becomes the distance, relative speed, angle, and signal level of one target data item in the current target data deriving process. In STEP S109, the signal processing unit 17 performs the determining process and the filtering process as described above, thereby deriving the longitudinal distance, lateral distance, and relative speed of the target data in one target deriving process. Also, in the process of STEP S109, it is determined whether the kind of the target derived by the signal processing unit 17 is a moving target or a stationary target.

Next, in STEP S110, on the target data derived in the determining process of STEP S109, the signal processing unit 17 performs a multiple-stationary target determining process of determining whether there exists the inside wall of any tunnel, any guardrail, or the like around the vehicle 100. In other words, the signal processing unit 17 determines whether there exists a continuing stationary target (for example, a stationary target continuing for a distance of 40 m or more) at a side of the lane ro1 in which the vehicle 100 is traveling. Specifically, for example, the signal processing unit 17 determines whether the number of times of scanning, in each of which the peak signals derived in the FFT process of STEP S105 includes more than 80 peak signals corresponding to stationary targets, of a plurality of times of scanning exceeds a predetermined number of times. Then, in a case where the number of times of that scanning exceeds the predetermined number of times, the signal processing unit 17 determines that the determination condition is satisfied. This is a process for determining whether the circumferences in which the vehicle 100 is traveling are circumferences where a multi-path reflected wave may occur.

Next, as shown in FIG. 9, in a case of determining that there exists a continuing stationary target at a side of the lane ro1 in which the vehicle 100 is traveling (Yes in STEP S111), the signal processing unit 17 proceeds to the process of STEP S112. Meanwhile, in a case of determining that there exists no continuing stationary target at a side of the traveling direction of the vehicle 100 (No in STEP S111), the signal processing unit 17 proceeds to the process of STEP S113.

In STEP S112, on the base of the target data derived in the determining process of the STEP S109, the signal processing unit 17 determines whether there exists any moving target based on a multi-path reflected wave. In a case where there exists a moving target based on a multi-path reflected wave, the signal processing unit 17 performs a process of changing the position information of the corresponding moving target. The process contents of this process of changing the position information of the moving target will be described below in detail.

Next, in STEP S113, the signal processing unit 17 performs a classifying process on the target data derived in STEP S109. Specifically, the signal processing unit 17 performs the following classification on each item of the target data. In a case where one moving target satisfies a predetermined condition for an object of a leading vehicle traveling in front of the vehicle 100, the signal processing unit 17 classifies the corresponding moving target as an object of the leading vehicle. Meanwhile, in a case where one moving target satisfies a predetermined condition for an object of the ACC, the signal processing unit 17 classifies the corresponding moving target as an ACC object.

Here, an example of the predetermined condition for classification as the leading vehicle is as follows. A moving target exiting in a range in which the longitudinal distance from the position of the radar apparatus 1 of the vehicle 100 is less than 120 m, the lateral distance in the left direction from the position of the radar apparatus 1 of the vehicle 100 is less 5.4 m, and the lateral distance in the right direction from the position of the radar apparatus 1 of the vehicle 100 is less 5.4 m (for example, a leading-vehicle determination range pr shown in FIG. 13 to be described below) is classified as an object of the leading vehicle. Also, an example of the predetermined condition for classification as the ACC object is as follows. A moving target existing in a range in which the longitudinal distance from the position of the radar apparatus 1 of the vehicle 100 is less than 120 m, the lateral distance in the left direction from the position of the radar apparatus 1 of the vehicle 100 is less than 1.8 mm, and the lateral distance in the right direction from the position of the radar apparatus 1 of the vehicle 100 is less 1.8 m (for example, the lane ro1 in which the vehicle 100 is traveling), the corresponding moving target is classified as the ACC object.

Next, in STEP S114, the signal processing unit 17 performs a process of combining target data items corresponding to each target, on the plurality of target data items. For example, in a case where a transmission wave is radiated from the transmitting antennae 13 of the radar apparatus 1 and the transmission wave is reflected from the front vehicle 200, a plurality of reflected waves are received by the receiving antennae 14. In other words, the reflected waves from a plurality of reflective points arrive the receiving antennae 14. As a result, the signal processing unit 17 derives a plurality of target data items different in the position information, on the basis of the reflected waves, respectively. However, since the plurality of target data items is originally the target data of the front vehicle 200 which is one target, the individual target data items need to be combined and be treated as one target data item. For this reason, the process of STEP S114 is performed. In other words, if the relative speeds of a plurality of target data items are substantially the same, and the longitudinal distances and lateral distances of the target data items are in the predetermined ranges, the signal processing unit 17 considers the plurality of target data items as the data of the same target, and performs a process of combining the plurality of target data items as one target data item. If the changed position information of the moving target in which the position information has been changed by the position information changing process of the moving target is derived by the process of STEP S112, it is possible to derive more accurate position information since the moving target of which the position information has been changed is added to the plurality of data items when combining the plurality of target data items as one target data item. In other words, when a plurality of target data items corresponding to one object are derived, by deriving a value obtained by averaging the position information of the plurality of target data items in which the moving target of which the position information is changed is added to the target data items to be combined (for example, an average value of the longitudinal distances of the plurality of target data items to which the changed moving target is added and an average value of the lateral distances of the plurality of target data items to which the changed moving target is added), it is possible to derive the accurate position information of the one object, as compared with a case where a value obtained by averaging the position information without adding the moving target in which the position information is changed.

Next, the signal processing unit 17 outputs a high-priority target data item of the target data items combined in STEP S114 to the vehicle control device 2 in STEP S115, and terminates the target data deriving process. Here, the high-priority target data item is, for example, a target data item having a relative speed higher than those of the other target data items, a target data item having a longitudinal distance and a lateral distance smaller than those of the other target data items, or the like.

<4-2. Position Information Changing Process>

Figure 10:
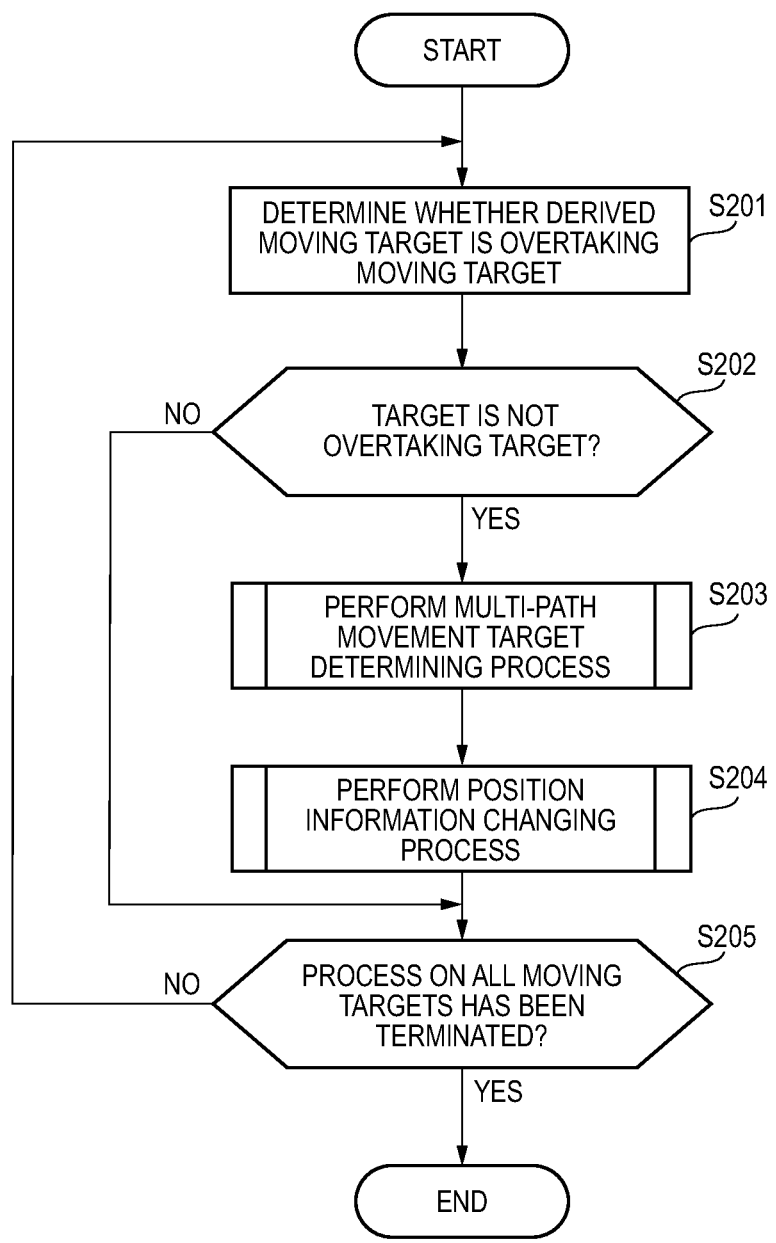
FIG. 10 is a flow chart of a position information changing process.

Next, the position information changing process of STEP S112 of FIG. 9 will be described in detail with reference to FIG. 10. FIG. 10 is a flow chart of the position information changing process. Referring to FIG. 10, in STEP S201, the signal processing unit 17 determines whether the moving target derived in the determining process of STEP S109 of FIG. 9 is a moving target existing on the neighboring lane ro2 shown in FIG. 4 and so on and overtaking the vehicle 100. Specifically, in a case where the target which is the object of the determination is a moving target corresponding to new pair data, the longitudinal distance of corresponding target data is less than 20 m, and the lateral distance of the corresponding target data is 1.8 m or more, the signal processing unit 17 determines that the corresponding moving target is a moving target existing on the neighboring lane ro2 and overtaking the vehicle 100 (hereinafter, referred to as an "overtaking target"). This is a process for preventing an overtaking target traveling in the neighboring lane ro2 from being erroneously determined as a moving target based on a multi-path reflected wave.

Then, in a case where the target which is the object of the determination of STEP S201 is an overtaking target (Yes in STEP S202), the signal processing unit 17 proceeds to the process of STEP S203. Meanwhile, in a case where the target which is the object of the determination of STEP S201 is not an overtaking target (No in STEP S202), the signal processing unit 17 proceeds to the process of STEP S205.

In STEP S203, on the basis of the target data of the target derived in the determining process of STEP S109, the signal processing unit 17 determines whether there exists any moving target such as a vehicle in a predetermined range separated by the inside wall of a tunnel, a guardrail, or the like from the position of the vehicle 100. In other words, the signal processing unit 17 determines whether there exists any moving target in a specific range in front of the vehicle 100 and on the opposite side of a continuing stationary target with respect to the position of the vehicle 100. This is a process for determining whether there exists a moving target based on a multi-path reflected wave in front of the vehicle 100. This multi-path movement target determining process will be described below in detail.

Next, in STEP S204, the signal processing unit 17 changes the position information of the moving target from a specific position to another position with the inside wall of the tunnel, the guardrail, or the like therebetween. In other words, in a case where a continuing stationary target exists, and the moving target exists in the specific range, the signal processing unit 17 changes the position information of the moving target to a position obtained by folding back the specific position with the continuing stationary target therebetween. This is a process for changing the position information of the moving target based on the multi-path reflected wave to the original position of the moving target. In this way, it is possible to derive the accurate position information of the moving target.

Then, if determining that the process on all of the moving target data derived in the determining that the process of STEP S109 has been terminated (Yes in STEP S205), the signal processing unit 17 terminates the position information changing process. Meanwhile, if determining that the process on all of the moving target data has not been terminated (No in STEP S205), the signal processing unit 17 returns to the process of STEP S201 and continues the position information changing process.

<4-3. Multi-Path Movement Target Determining Process>

Figure 11:
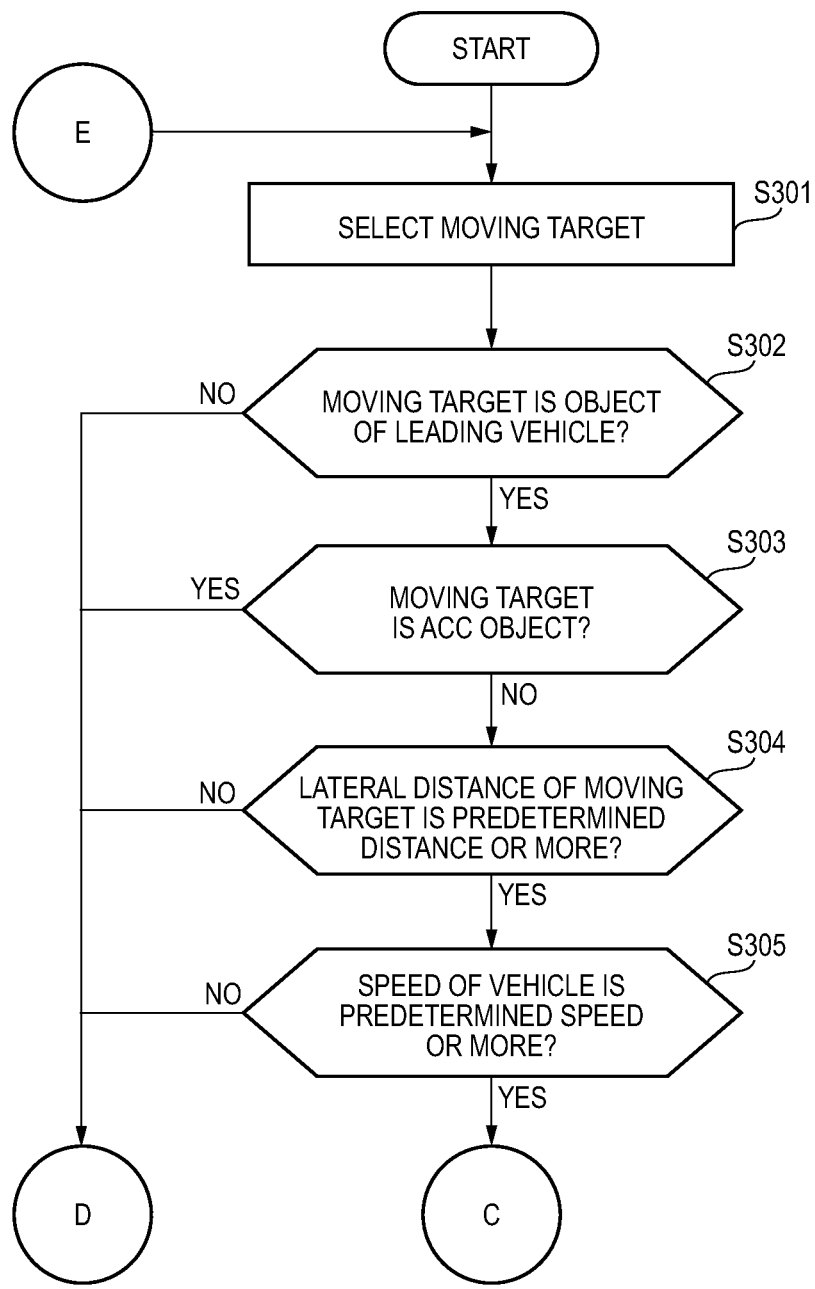
FIG. 11 is a flow chart of a multi-path movement target determining process.
Figure 12:
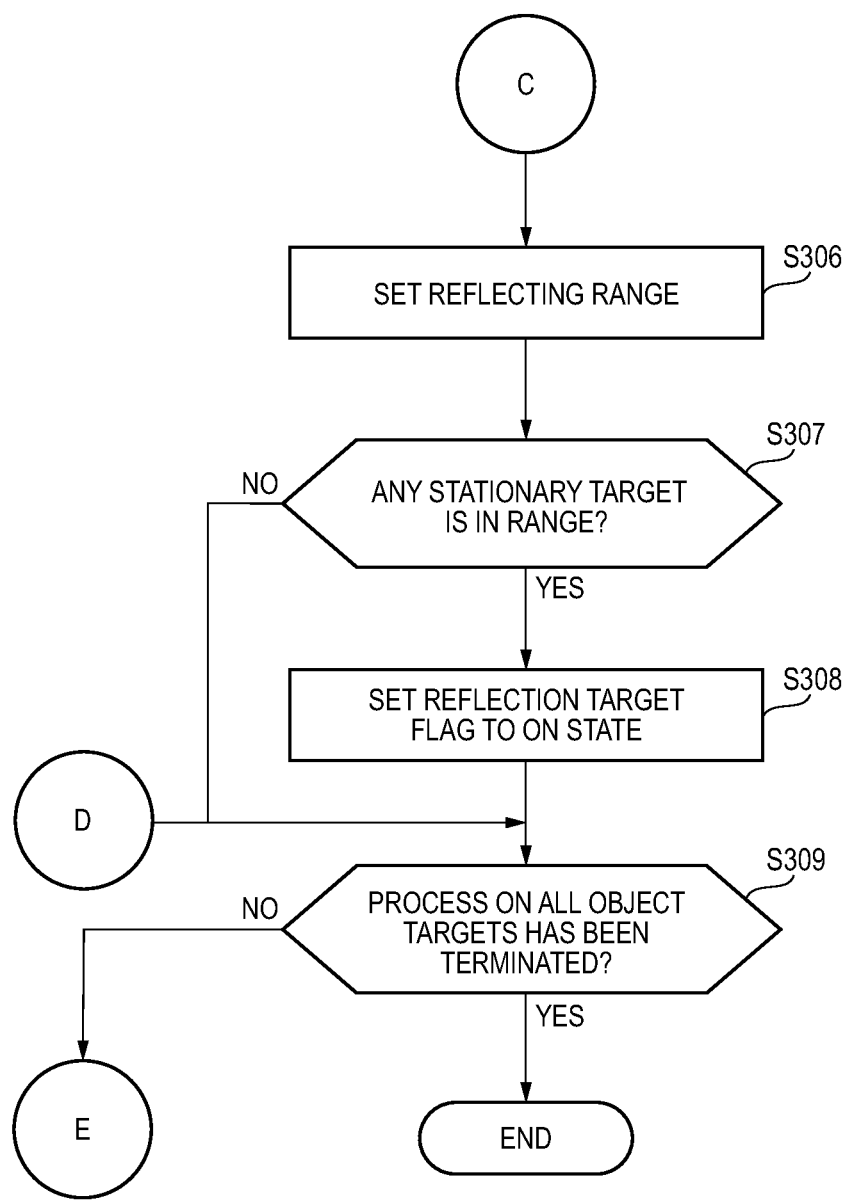
FIG. 12 is another flow chart of the multi-path movement target determining process.
Figure 13:
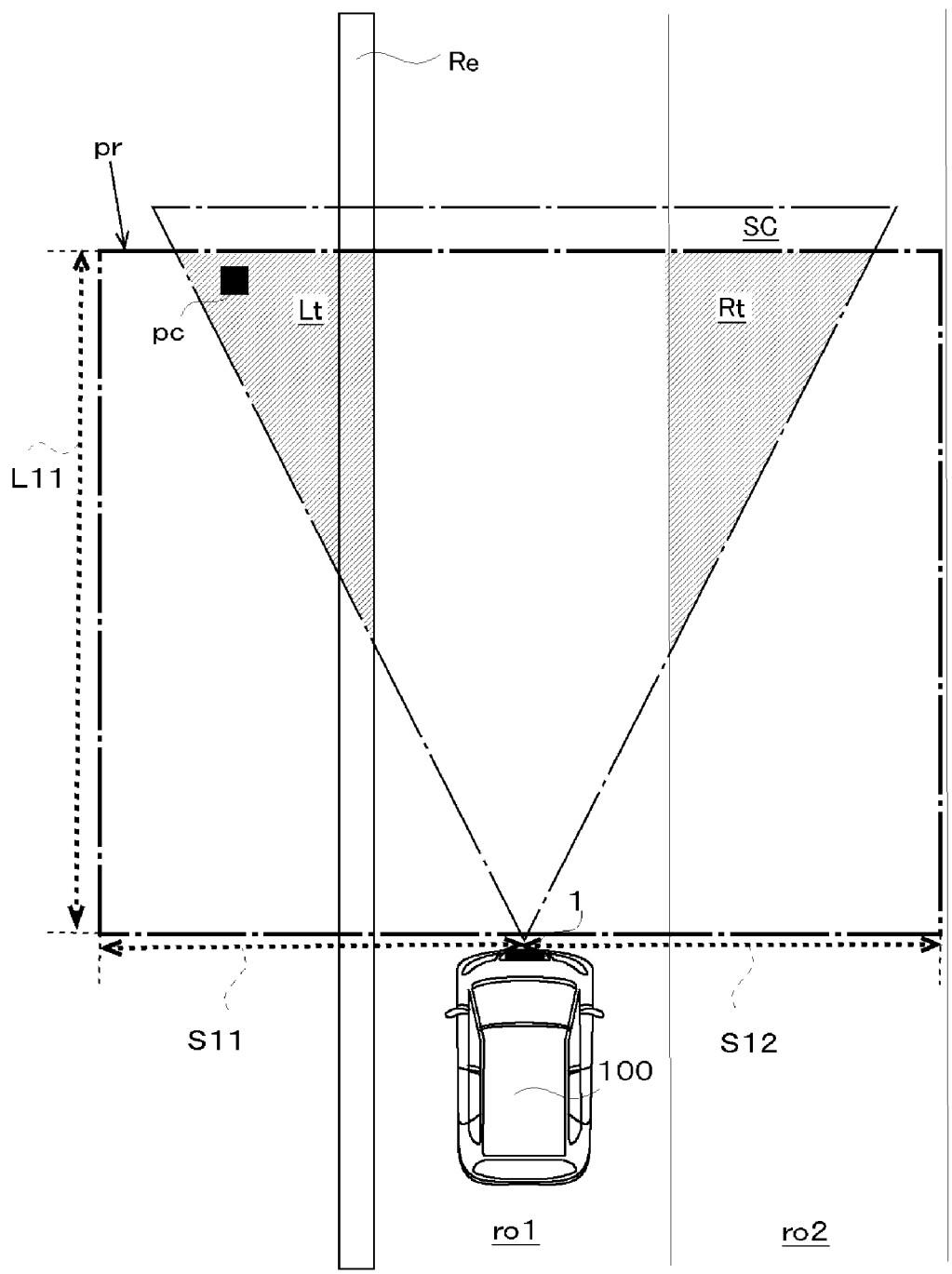
FIG. 13 is a view illustrating a specific range in determining a multi-path movement target.

Now, the multi-path movement target determining process of STEP S203 will be described with reference to FIGS. 11 to 13. FIGS. 11 and 12 are flow charts of the multi-path movement target determining process. This process to be described now is a process for deriving each moving target based on a multi-path reflected wave.

In FIG. 11, in a case where a plurality of moving targets has been derived in the determining process of STEP S109, in STEP S301, the signal processing unit 17 selects one moving target.

Next, in STEP S302, the signal processing unit 17 determines whether the moving target derived in the current target deriving process has been classified as an object of the leading vehicle in the classifying process of STEP S113 of the previous target deriving process. In other words, the signal processing unit 17 determines whether the moving target has been classified as an object of the leading vehicle in the classifying process of the previous target deriving process, with respect to the target data of the past corresponding pair data derived in the current target deriving process. Then, in a case of determining that the moving target has been classified as an object of the leading vehicle (Yes in STEP S302), the signal processing unit 17 proceeds to the process of STEP S303. Meanwhile, in a case of determining that the moving target has not been classified as an object of the leading vehicle (No in STEP S302), the signal processing unit 17 proceeds to the process of STEP S309 to be described below.

In STEP S303, the signal processing unit 17 determines whether the moving target derived in the current target deriving process of the radar apparatus 1 has been classified as the ACC object in the classifying process of STEP S113 of the previous target deriving process. In other words, the signal processing unit 17 determines whether the moving target has been classified as the ACC object in the classifying process of the previous target deriving process, with respect to the target data of the past corresponding pair data derived in the current target deriving process. Then, in a case of determining that the moving target has not been classified as the ACC object (No in STEP S303), the signal processing unit 17 proceeds to the process of STEP S304. Meanwhile, in a case of determining that the moving target has been classified as the ACC object (Yes in STEP S303), the signal processing unit 17 proceeds to the process of STEP S309.

In STEP S304, the signal processing unit 17 determines whether the lateral distance of the moving target in the current target deriving process is a predetermined distance or more (for example, 2.8 m or more). In a case of determining that the lateral distance of the moving target is the predetermined distance or more (Yes in STEP S304), the signal processing unit 17 proceeds to the process of STEP S305. Meanwhile, in a case of determining that the lateral distance of the moving target is less than the predetermined distance (No in STEP S304), the signal processing unit 17 proceeds to the process of STEP S309. Like this, in the determining processes of STEPS S302 to S304, it is determined whether the moving target exists in the specific range on the opposite side of the shelter Re, which is a continuing stationary target, with respect to the position of the vehicle 100.

Now, the determination on whether the moving target exists in the specific range on the opposite side of the stationary target with respect to the vehicle 100 will be described with reference to FIG. 13. FIG. 13 is a view illustrating the specific range in the multi-path movement target determining process. From the scan range SC of the vehicle 100 of FIG. 13, the moving target pc has been derived. Also, the moving target pc has been already determined as a moving target in the determining process of STEP S109. Next, the signal processing unit 17 determines whether the moving target pc is an object of the leading vehicle, that is, whether the moving target pc exists in the range of the leading-vehicle determination range pr (corresponding to STEP S302 of FIG. 11). The leading-vehicle determination range pr becomes a range in which the longitudinal distance from the position of the radar apparatus 1 of the vehicle 100 is a longitudinal distance L11 (for example, 120 m or less), the lateral distance from the position of the radar apparatus 1 of the vehicle 100 in the left direction relative to the vehicle traveling direction is a lateral distance S11 (for example, 5.4 m or less), and the lateral distance from the position of the radar apparatus 1 in the right direction relative to the vehicle traveling direction is a lateral distance S12 (for example, 5.4 m or less). Here, the moving target pc exists in the leading-vehicle determination range pr.

Next, the signal processing unit 17 determines whether the moving target pc is an ACC object, that is, whether the moving target pc exists in front of the vehicle 100 in the lane ro1 in which the vehicle 100 is traveling (corresponding to STEP S303 of FIG. 11). The range for classification as the ACC object is a range in front of the vehicle 100 on the lane ro1. Specifically, the range for classification as the ACC object becomes a range in which the longitudinal distance from the position of the radar apparatus 1 of the vehicle 100 is less than 120 m or less, the lateral distance in the left direction from the position of the radar apparatus 1 of the vehicle 100 is less than 1.8 m, and the lateral distance in the right direction from the position of the radar apparatus 1 of the vehicle 100 is less than 1.8 m.

In addition to the range for classification as the ACC object, there are a specific range Lt and a specific range Rt on the left and right of the vehicle 100, respectively, and the moving target pc exists in the specific range Lt. Like this, in a case where the moving target exists in any one of the specific range Lt and the specific range Rt which are ranges in the leading-vehicle determination range pr of the scan range SC of the radar apparatus 1 and out of the lane (the lane ro1) in which the vehicle 100 is traveling, the signal processing unit 17 performs a process of setting a reflecting range of STEP S306 to be described below.

Returning to FIG. 11, in STEP S305, the signal processing unit 17 determines whether the vehicle speed of the vehicle 100 is a predetermined speed or more (for example, 40 km/h or more) on the basis of a signal input from the vehicle speed sensor 40. In a case of determining that the vehicle speed of the vehicle 100 is the predetermined speed or more (Yes in STEP S305), the signal processing unit 17 proceeds to the process of STEP S306. Meanwhile, in a case of determining that the vehicle speed of the vehicle 100 is less than the predetermined speed (No in STEP S305), the signal processing unit 17 proceeds to the process of STEP S309. This condition is set because in the case where the speed of the vehicle 100 is the predetermined speed or more, it becomes difficult to perform the determining process.

In STEP S306, in order to confirm whether the moving target pc is a target based on a multi-path reflected wave, the signal processing unit 17 sets the reflecting range (for example, a reflecting range qe shown in FIG. 14 to be described below) on the basis of the position of the moving target pc.

Figure 14:
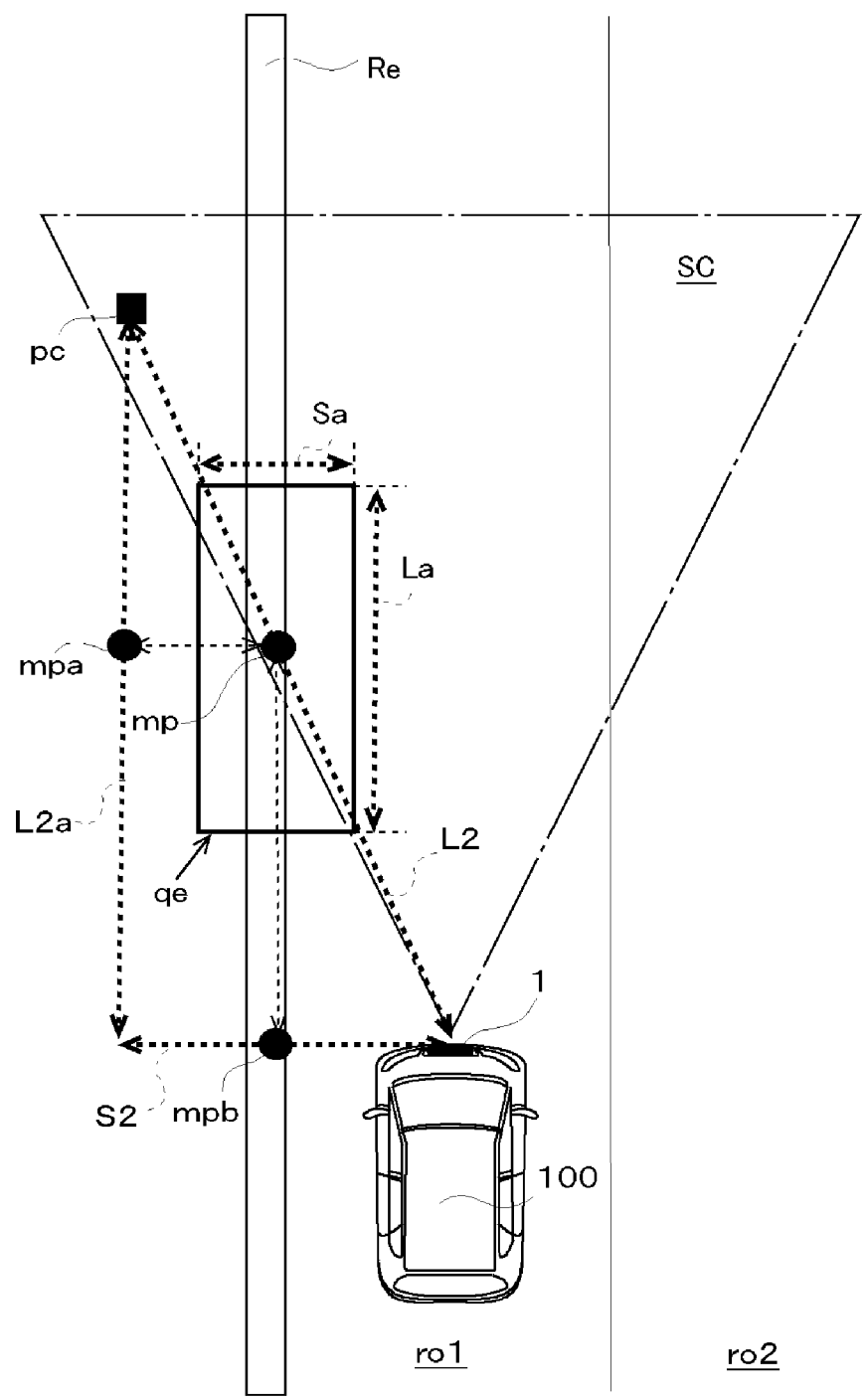
FIG. 14 is a view illustrating setting of a reflecting range.

Now, the setting of the reflecting range qe will be described in detail with reference to FIG. 14. FIG. 14 is a view illustrating the setting of the reflecting range qe corresponding to the position of the moving target pc. The signal processing unit 17 performs the operation of a trigonometric function on the basis of the longitudinal distance L2 and lateral distance S2 of the moving target pc, thereby obtaining a distance L2a. Then, the signal processing unit 17 derives a longitudinal center mpa which is the center of the distance L2a. Also, the signal processing unit 17 derives a lateral center mpb which is the center of the lateral distance S2. Then, the signal processing unit 17 derives a line segment extending in the angle direction of the moving target pc and connecting the moving target pc and the radar apparatus 1, and the reflective point mp which is the intersection of the longitudinal center mpa and the lateral center mpb. Next, the signal processing unit 17 derives the reflecting range qe having a longitudinal distance La (for example, 30 m) with the reflective point mp as the center, and a lateral distance Sa (for example, 4 m) with the reflective point mp as the center.

Returning to FIG. 12, in STEP S307, the signal processing unit 17 determines whether there exists any stationary target to be a factor causing a multi-path reflected wave in the reflecting range qe. Then, in a case of determining that there exists at least one stationary target in the reflecting range qe (Yes in STEP S307), the signal processing unit 17 proceeds to the process of STEP S308. Meanwhile, in a case of determining that there exists no stationary target in the reflecting range qe (No in STEP S307), the signal processing unit 17 proceeds to the process of STEP S309. In other words, the signal processing unit 17 performs a process of determining whether there exists at least one stationary target in a predetermined range (the reflecting range qe where there may be a stationary target to be a factor causing the moving target pc based on a multi-path reflected wave) corresponding to the specific position where the moving target pc exists, between the position of the vehicle 100 and the specific position. In this way, it is possible to derive the accurate position information of the moving target pc corresponding to the multi-path reflected wave. Also, a stationary target exiting in the reflecting range qe is a portion of the above-mentioned continuing stationary target.

In STEP S308, the signal processing unit 17 sets a reflection target flag, which represents that there a continuing stationary target exists next to the lane ro1 in which the vehicle 100 is traveling, and the moving target pc exists in the specific range Lt, to an ON state, and records the reflection target flag information in the memory 172.

Next, if determining that the process on all target data which are objects of the multi-path movement target determining process has been terminated (Yes in STEP S309), the signal processing unit 17 terminates the multi-path movement target determining process and proceeds to the process of STEP S204 of FIG. 10. Meanwhile, if determining that the process on all object target data has not bee terminated (No in STEP S309), the signal processing unit 17 returns to the process of STEP S301, and continues the multi-path movement target determining process.

<4-4. Position Information Changing Process>

Figure 15:
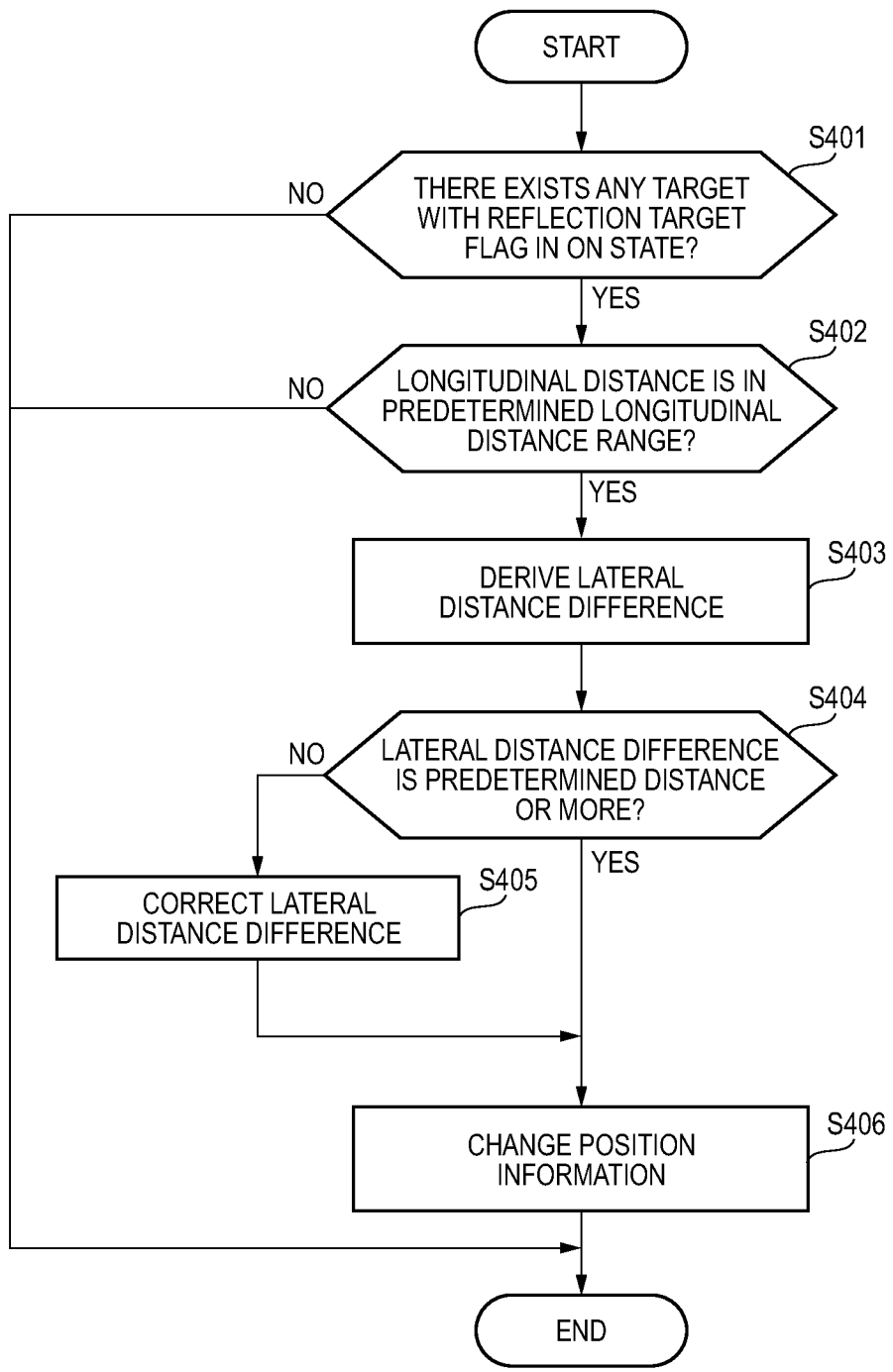
FIG. 15 is a flow chart of a position changing process.

Now, a process of changing the position information of a moving target will be described with reference to FIG. 15. This process to be now described is for changing the position information of a moving target based on a multi-path reflected wave to the original position of the moving target. FIG. 15 is a flow chart of the position information changing process. In STEP S401, the signal processing unit 17 determines whether information on any moving target with a reflection target flag in an ON state has been recorded in the memory 172.

Then, in a case of determining that information on a moving target with a reflection target flag in an ON state has been recorded in the memory 172 (Yes in STEP S401), the signal processing unit 17 selects the moving target to be an object, and proceeds to the process of STEP S402. Meanwhile, in a case of determining that information on any moving target with a reflection target flag in an ON state has not been recorded in the memory 172 (No in STEP S401), the signal processing unit 17 terminates the position information changing process, and proceeds to the process of STEP S205 of FIG. 10.

In STEP S402, the signal processing unit 17 determines whether the longitudinal distance of the moving target with the reflection target flag in the ON state with respect to the vehicle 100 is in a predetermined longitudinal distance range (for example, in a longitudinal distance range from 2.8 m to 5.4 m). Then, in a case of determining that the longitudinal distance is in the predetermined longitudinal distance range (Yes in STEP S402), the signal processing unit 17 proceeds to the process of STEP S403. Meanwhile, in a case of determining that the longitudinal distance is not in the predetermined longitudinal distance range (No in STEP S402), the signal processing unit 17 terminates the position information changing process, and proceeds to the process of STEP S205 of FIG. 10. Therefore, in a case of changing the position information of a moving target, the changed position information of the moving target becomes a position on the lane ro1 in which the vehicle 100 is traveling. In other words, a moving target to be at a position of the ACC object of the vehicle 100 by position information change is set as an object of the position information change.

Next, in STEP S403, the signal processing unit 17 subtracts the lateral distance of the stationary target relative to the vehicle 100 from the lateral distance of the moving target with the reflection target flag in the ON state with respect to the vehicle 100, thereby deriving a lateral distance difference. This derivation of the lateral distance difference will be described below in detail.

Then, in a case of determining that the lateral distance difference is a predetermined distance or more (for example, 1 m or more) (Yes in STEP S404), the signal processing unit 17 proceeds to the process of STEP S406. Meanwhile, in a case of determining that the lateral distance difference is less than the predetermined distance (for example, less than 1 m) (No in STEP S404), the signal processing unit 17 proceeds to the process of STEP S405.

In STEP S405, the signal processing unit 17 performs a process of adding a predetermined correlation value to the lateral distance difference, thereby deriving a new lateral distance difference. For example, in a case where the lateral distance difference is 0.5 m, the signal processing unit 17 adds a correlation value of 2 m to the lateral distance difference, thereby setting the lateral distance difference to 2.5 m. In a case where a difference correlation value is smaller than the width of the shelter Re which is a stationary target, if the position information changing process is performed on the moving target in the next STEP S406, the position of the moving target becomes a position on the stationary target. In order to prevent this, STEP S405 is performed.

In STEP S406, on the basis of the lateral distance difference, the signal processing unit 17 changes the position information of the moving target with the reflection target flag in the ON state. Specifically, the signal processing unit 17 changes the position of the moving target with the reflection target flag in the ON state to a position where the vehicle 100 is traveling, the position obtained by folding back a specific position which is the position of the moving target in the specific range Lt with the continuing stationary target therebetween. In this way, it is possible to derive the accurate position information of the moving target.

Figure 16:
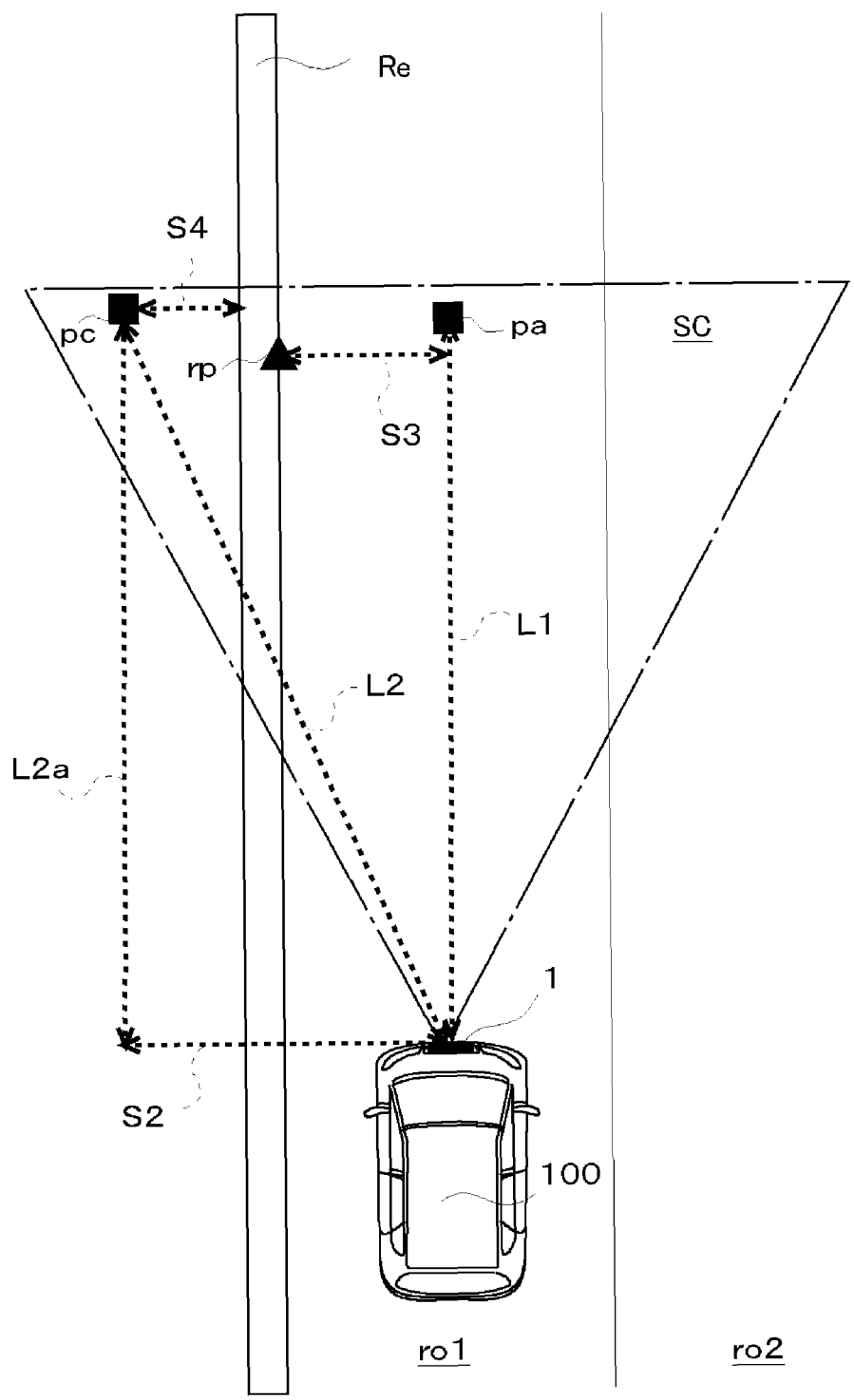
FIG. 16 is a view illustrating deriving of a lateral distance difference.

Now, the lateral distance difference derivation and position information change of the position information changing process will be described in detail with reference to FIGS. 16 and 17. FIG. 16 is a view illustrating derivation of a lateral distance difference S4. The signal processing unit 17 subtracts the lateral distance S3 of the stationary target rp from the lateral distance S2 of the moving target pc derived in the scan range SC of the radar apparatus 1, thereby obtaining the difference. In other words, the signal processing unit 17 derives the lateral distance difference S4 of the moving target pc relative to the stationary target rp. Then, the signal processing unit 17 uses the lateral distance difference S4 to perform the process of changing the position of the moving target. This process will be described in detail with reference to FIG. 17.

Figure 17:
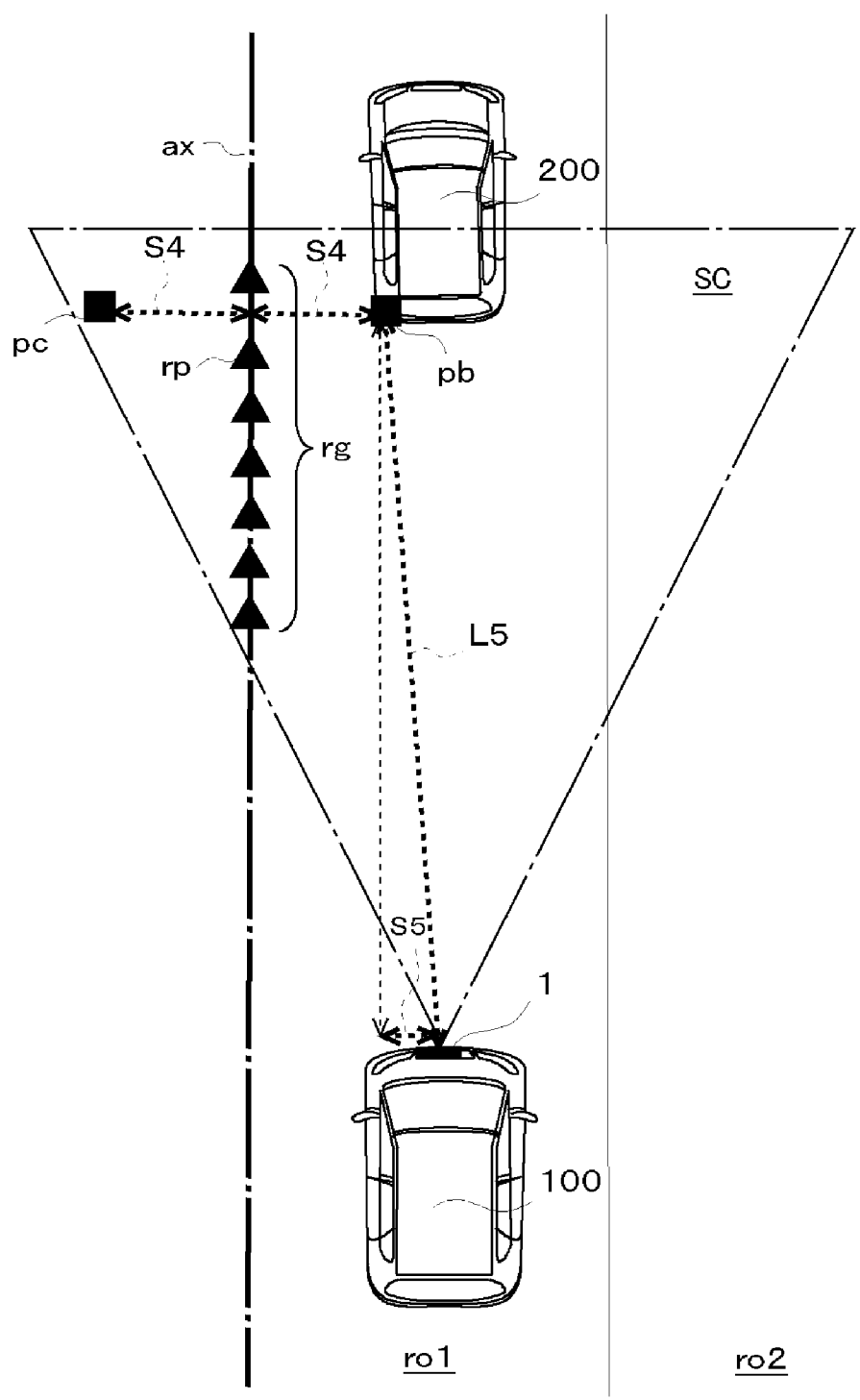
FIG. 17 is a view illustrating changing of the position information of a moving target.

FIG. 17 is a view illustrating changing of the position information of the moving target pc. The signal processing unit 17 uses the position information of the moving target pc (the longitudinal distance L2 and lateral distance S2 of the moving target pc), the lateral distance difference S4, and the position information of the stationary target rp (the longitudinal distance L3 and lateral distance S3 of the stationary target rp) to change the position information of the moving target pc to the position corresponding to the moving target pb. In other words, the signal processing unit 17 changes the position information of the moving target pc to a position (the position of the moving target pb) almost symmetrical to the specific position (the position of the moving target pc) about a line segment ax extending in the traveling direction of the vehicle 100 and including the stationary target rp. As a result, the position information (the longitudinal distance L2 and the lateral distance S2) of the moving target pc is changed to position information (a longitudinal distance L5 and a lateral distance S5) corresponding to the moving target pb. In this way, it is possible to derive the accurate position information of the moving target. Particularly, it is possible to derive the accurate position information of the moving target existing at the position symmetrical to the original position.

Here, a lateral distance S4 from the position (specific position) of the moving target pc of FIG. 17 to the axis ax of symmetry in the lateral direction and a lateral distance S4 from the position of the moving target pb to the axis ax of symmetry in the lateral direction are the same. However, they may be set to different distances. Also, as shown in FIG. 17, the signal processing unit 17 derives not only the stationary target rp but also other stationary targets in the scan range SC. By doing like this, the signal processing unit 17 derives a plurality of stationary targets rg corresponding to the continuing stationary target.

MODIFICATIONS

Although the embodiment of the present invention has been described, the present invention is not limited to the above-mentioned embodiment, but can be changed in various forms. Hereinafter, these modifications will be described. All forms including the forms described in the above-mentioned embodiment and forms to be described below can be appropriately combined.

In the above-mentioned embodiment, the signal processing unit 17 changes the position information (longitudinal distance and lateral distance) of the moving target. However, the signal processing unit 17 may also change relative speed information other than the position information. Similarly to the changing of the position information, the changing of the relative speed may be performed by an operation using a trigonometric function.

Also, in the above-mentioned embodiment, in a case of changing the position information of the moving target from the specific position, the signal processing unit 17 changes the position information to a position on the opposite side of the stationary target rp with respect to the specific position on the lane ro1 in which the vehicle is traveling. However, the changed position on the opposite side of the continuing stationary target with respect to the specific position may be a position on a lane (for example, the neighboring lane ro2 or another lane) other than the lane ro1.

Also, in the above-mentioned embodiment, the continuing stationary target is an object having a certain length along the traveling direction of the vehicle 100, for example, vehicles, the inside wall of a tunnel, a guardrail, or the like continuing for 40 m or more at a side of the traveling direction of the vehicle 100, and does not need necessarily to continue, and may be stationary targets existing at regular intervals or at different intervals.

Also, in the above-mentioned embodiment, in the multiple-stationary target determining process of STEP S110, not only the method of determining the number of peak signals but also other determining methods may be used. Specifically, the signal processing unit 17 may determine whether a moving target existing at a specific position having the lateral distance larger than the lateral distance of the continuing stationary target has been derived a predetermined number of times or more by a plurality of times of scanning, and in a case where a moving target existing at a specific position having the lateral distance larger than the lateral distance of the continuing stationary target has been derived the predetermined number of times or more, the signal processing unit 17 may determine that the determination condition is satisfied.

Also, in the above-mentioned embodiment, as the conditions of a case where the signal processing unit 17 changes the position information of the moving target with the reflection target flag in the ON state, in STEP S402, in a case where the lateral distance of the moving target is in the predetermined lateral distance range, one of the conditions to change the position information is satisfied. However, the lateral distance of the moving target does not need necessarily to be in the predetermined lateral distance range. In other words, in a case of changing the position information of the moving target, even if the changed position is, for example, a position on the neighboring lane ro2 or a position on another lane, not a position on the lane ro1 in which the vehicle 100 is traveling, one of the conditions to change the position information may be considered as being satisfied.

Also, in the above-mentioned embodiment, in a case where the signal processing unit 17 derives the moving target at the position of the moving target (for example, the moving target pc) based on the multi-path reflected wave, not at the position of the moving target (for example, the moving target pb) based on the direct wave, the signal processing unit 17 changes the position information of the moving target pc. Besides, in a case where the signal processing unit 17 performs the target deriving process a plurality of times, both of the moving target based on the direct wave and the moving target whose position information based on the multi-path reflected wave has been changed may be derived. In this case, for example, the position information may be changed to the sum of the individual position information items multiplied by predetermined ratios. Specifically, the position information of the moving target may be changed to the sum of the product of 0.9 and the value of the position information of the moving target based on the direct wave, and the product of 0.1 and the value of the position information of the moving target to which the position information based on the multi-path reflected wave has been changed.

Further, in the plurality of target deriving processes, in a case where the moving target based on the direct wave was derived in the past (previous) deriving process, but is not derived in the current deriving process, on the basis of the position information derived in the prior deriving process, a process of predicting the position information in the current deriving process (hereinafter, referred to as an "extrapolating process") may be performed. Then, in a case where, in one target deriving process, the signal processing unit 17 derives the moving target based on the basis of the direct wave by the extrapolating process, and the moving target whose position information has been changed according to the position information based on the multi-path reflected wave is also derived, similarly to the case where the moving target of the direct wave and the moving target whose position information has been changed according to the position information based on the multi-path reflected wave are derived, the position information may be changed to the sum of the individual position information items multiplied by predetermined ratios.

Specifically, by the extrapolating process, the position information of the moving target may be changed to the sum of the product of 0.6 and the value of the position information of the moving target based on the direct wave derived and the product of 0.4 and the value of the position of the moving target whose position information has been changed according to the position information based on the multi-path reflected wave. Like this, in the case of the extrapolating process, the ratio of the value of the position of the moving target whose position information has been changed according to the position information based on the multi-path reflected wave may be increased as compared to the case where the moving target based on the direct wave is derived.

Also, in the above-mentioned embodiment, the weighting on the individual data items in the filtering of STEP S109 shown in FIG. 8 is an example, and the weights may be values different from those in the above-mentioned embodiment.

Also, in the above-mentioned embodiment, in a process such as the multiple-stationary target determining process of STEP S110 or the multi-path movement target determining process of STEP S203, the determination is performed by one target deriving process. However, in a case where the determination condition is satisfied a predetermined number of times or more by the plurality of target deriving processes, only when all determination conditions of the individual processes are cleared, the next process may be performed.

Also, in the above-mentioned embodiment, as an example of the method in which the signal processing unit 17 derives the reflecting range qe, the method in which the signal processing unit 17 derives the line segment extending in the angle direction of the moving target pc and connecting the moving target pc and the radar apparatus 1, and the reflective point mp which is the intersection of the longitudinal center mpa and the lateral center mpb, and derives the predetermined reflecting range qe with the reflective point mp as the center. However, the method of deriving the reflecting range qe may be other methods, and if it is possible to set a certain range including the reflective point mp, the signal processing unit 17 may derive the reflecting range qe by other methods.

Also, in the above-mentioned embodiment, the vehicle speed sensor 40, the steering sensor 41, the brake 50, the throttle 51, and the alarm unit 52 are provided outside the vehicle control system 10. However, at least one unit of them may be provided inside the vehicle control system 10.

Also, in the above-mentioned embodiment, the antenna scan scheme of the radar apparatus 1 is a mega scan scheme. However, the technology of the above-mentioned embodiment can be applied to an electronic san scheme of using at least one algorithm of Digital Beam Forming (DBF), Propagator method based on an Improved Spatial-smoothing Matrix (PRISM), Multiple Signal Classification (MUSIC), Estimation of Signal Parameters via Rotational Invariance Techniques (ESPRIT), and the like to calculate the angle of a reflective point of an object in estimating the direction of the object without driving an antenna.

Also, in the above-mentioned embodiment, the transmission wave and the reception wave which are transmitted and received by a flat panel antenna fa are signals such as electric waves, laser beams, or ultrasonic waves. However, the transmission wave may be any other signal which can be transmitted from the flat panel antenna fa, rebound from an object, and be received as a reflected wave, thereby making it possible to detect the reflective point of the object.

Also, in the above-mentioned embodiment, the antenna is the flat panel antenna fa. However, the antenna may be any other antenna such as a lens antenna or a reflector antenna capable of transmitting a transmission wave and receiving the reflected wave of the transmission wave from an object. Further, instead of the transmitting antennae 13 and the receiving antennae 14, bidirectional antennae capable of performing both of transmission and reception may be used.

Also, in the above-mentioned embodiment, the radar apparatus 1 may be mounted on a vehicle, and may also be used for many purposes (for example, at least one of monitoring of an aircraft in flight and monitoring of a ship under way).

What is claimed is:

1. A radar apparatus configured to radiate a transmission wave relating to a frequency-modulated transmission signal, receive a reflected wave of the transmission wave from a target as a reception signal, and derive at least position information of the target from the reception signal, the radar apparatus comprising:
    a first determining section configured to determine whether there exists a continuing stationary target at a side of a lane in which a vehicle with the radar apparatus mounted thereon is traveling;
    a second determining section configured to determine whether there exists a moving target in a specific range which is in front of the vehicle and on an opposite side of the stationary target with respect to a position of the vehicle; and
    a changing section configured to change position information of the moving target to a position obtained by folding back a specific position which is the position of the moving target in the specific range with the stationary target therebetween in a case where the stationary target exists and the moving target exists in the specific range,
    wherein the position changed by the changing section is used for deriving the position information of the target.

2. The radar apparatus according to claim 1, wherein the changing section changes the position information of the moving target to a position substantially symmetrical to the specific position about a line segment extending in a traveling direction of the vehicle and including the position of the stationary target.

3. The radar apparatus according to claim 1,
    wherein the second determining section determines whether there exists at least one stationary target between the position of the vehicle and the specific position and in a predetermined range relative to the specific position, and
    wherein the changing section changes the position information of the moving target in a case where there exists the at least one stationary target.

4. A signal processing method for a radar apparatus configured to radiate a transmission wave relating to a frequency-modulated transmission signal, receive a reflected wave of the transmission wave from a target as a reception signal, and derive at least position information of the target from the reception signal, the signal processing method comprising:
- determining whether there exists a continuing stationary target at a side of a lane in which a vehicle with the radar apparatus mounted thereon is traveling;
- determining whether there exists a moving target in a specific range which is in front of the vehicle and on an opposite side of the stationary target with respect to a position of the vehicle; and
- changing position information of the moving target to a position obtained by folding back a specific position which is the position of the moving target in the specific range with the stationary target therebetween in a case where the stationary target exists and the moving target exists in the specific range,
- wherein the position changed in the changing is used for deriving the position information of the target.

* * * * *